United States Patent
Orlamünder et al.

(10) Patent No.: US 7,635,056 B2
(45) Date of Patent: Dec. 22, 2009

(54) PRESSURE PLATE ASSEMBLY, CLUTCH DISK ARRANGEMENT, AND FRICTION CLUTCH, ESPECIALLY A MULTI-DISK CLUTCH

(75) Inventors: Andreas Orlamünder, Schweinfurt (DE); Thorsten Müller, Würzburg (DE); Michael Kühner, Schwanfeld (DE); Winfried Bokisch, Maibach (DE); Sebastian Vogt, Bad Neustadt (DE); Waldemar Mensch, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/187,835

(22) Filed: Aug. 7, 2008

(65) Prior Publication Data

US 2008/0296116 A1 Dec. 4, 2008

Related U.S. Application Data

(62) Division of application No. 11/172,312, filed on Jun. 29, 2005, now abandoned.

(30) Foreign Application Priority Data

| Jun. 29, 2004 | (DE) | .......................... 10 2004 031 338 |
| Sep. 22, 2004 | (DE) | .......................... 10 2004 045 795 |
| Feb. 21, 2005 | (DE) | .......................... 10 2005 007 798 |
| May 17, 2005 | (DE) | .......................... 10 2005 023 354 |

(51) Int. Cl.
*F16D 13/70* (2006.01)

(52) U.S. Cl. .................. 192/70.18; 192/70.28

(58) Field of Classification Search ............... 192/70.18
See application file for complete search history.

(56) References Cited

U.S. PATENT DOCUMENTS

| 3,061,062 | A | | 10/1962 | Smirl | |
| 4,790,419 | A | * | 12/1988 | Loizeau | ................... 192/70.18 |
| 5,090,537 | A | * | 2/1992 | Fukuda | ................... 192/70.27 |
| 6,070,708 | A | | 6/2000 | Fukuda et al. | |
| 6,409,002 | B1 | | 6/2002 | Orlamünder et al. | |
| 6,609,601 | B2 | | 8/2003 | Vogt | |
| 6,793,058 | B2 | | 9/2004 | Orlamünder | |
| 6,866,132 | B2 | * | 3/2005 | Gochenour et al. | ...... 192/70.18 |
| 7,044,283 | B2 | * | 5/2006 | Gokan et al. | ............... 192/70.2 |
| 2004/0200686 | A1 | | 10/2004 | Schauer et al. | |

* cited by examiner

*Primary Examiner*—Rodney H Bonck
(74) *Attorney, Agent, or Firm*—Cohen Pontani Lieberman & Pavane LLP

(57) ABSTRACT

A pressure plate arrangement for a friction clutch includes a housing rotatably fixed to an abutment arrangement for joint rotation about an axis of rotation and a plate arrangement with at least one intermediate plate and a pressure plate. At least one of the intermediate and pressure plates is mounted in the housing and axially movable relative thereto and rotateable about the axis of rotation. An energy storage device coupled to the housing generates an elastic restoring force on the plate arrangement. A releasing spring arrangement located between the housing and plate arrangement is tensioned to generate an elastic restoring force on the pressure plate in a second direction opposite to the first direction. A clutch disk arrangement is clamped between the abutment arrangement and the at least one intermediate plate, or between any two plates of the plate arrangement.

33 Claims, 21 Drawing Sheets

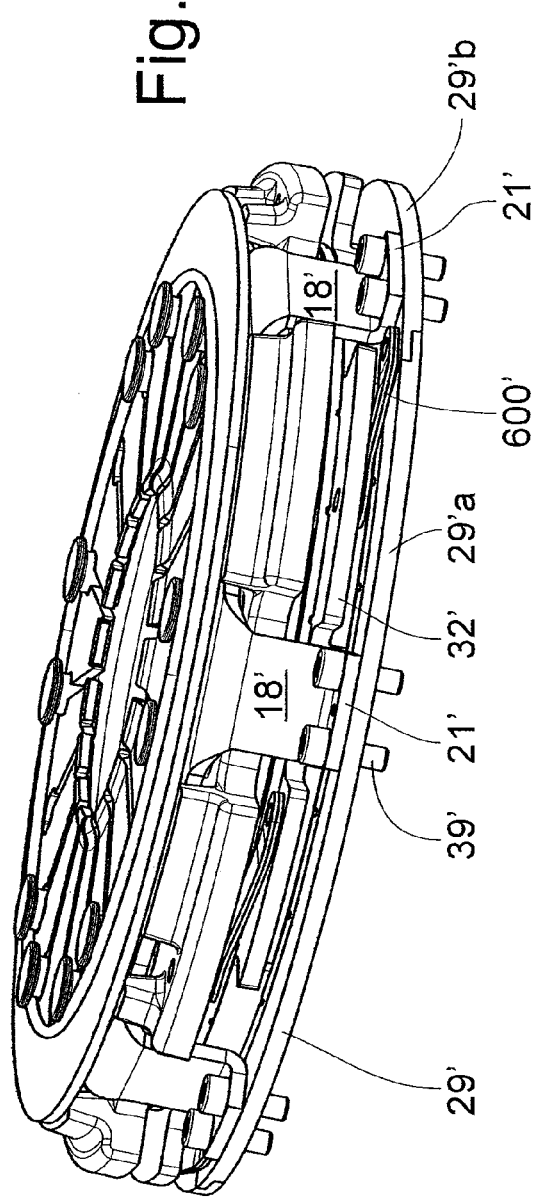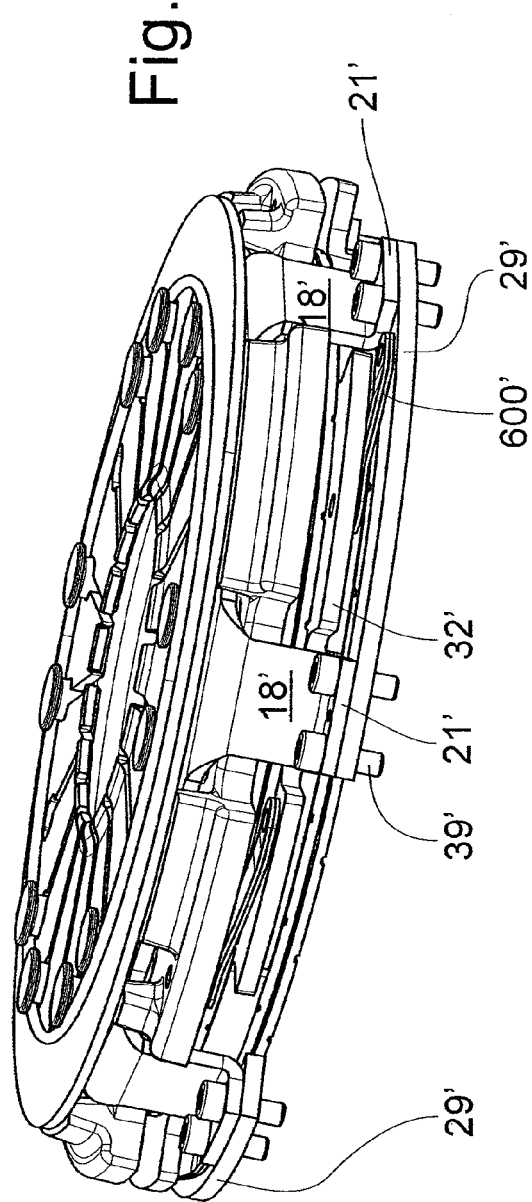

PRESSURE PLATE ASSEMBLY, CLUTCH DISK ARRANGEMENT, AND FRICTION CLUTCH, ESPECIALLY A MULTI-DISK CLUTCH

CROSS REFERENCE TO RELATED APPLICATIONS

This application is a divisional of U.S. patent application Ser. No. 11/172,312 which was filed with the U.S. Patent and Trademark Office on Jun. 29, 2005 now abandoned. Priority is claimed for this invention and application, corresponding application(s) having been filed in Germany on Jun. 29, 2004, No. 10 2004 031 338.5, Germany on Sep. 22, 2004, No. 10 2004 045 795.6, Germany on Feb. 21, 2005, No. 10 2005 007 798.6, Germany on May 17, 2005, No. 10 2005 023 354.6 respectively.

BACKGROUND OF THE INVENTION

1. Field of the Invention

The invention relates to a pressure plate assembly, especially for a friction clutch.

2. Description of the Related Art

Various embodiments of these types of pressure plate assemblies are known from U.S. Pat. No. 6,409,002. In the known multi-disk pressure plate assemblies, an intermediate plate and the pressure plate of the plate arrangement are separated from each other during a clutch-release operation by a helical compression spring acting between them; the intermediate plate and a flywheel acting as an abutment are also separated from each other by a similar spring. So that the pressure plate and the intermediate plate can be connected for rotation in common to the clutch housing, which is designed as an integral part of the flywheel, these components are designed with radially outward-extending projections for rotational engagement, which fit into rotational-engagement openings in the housing. Restoring force-generating elements, which act between the pressure plate and the intermediate plate on one side and the housing on the other side, are provided to pretension the plates in the circumferential direction into a centered position in which the rotational-engagement projections assume an essentially central position within the associated rotational-engagement openings. In this centered position, there is essentially no contact between the rotational-engagement projections and the housing. As a result, the rotational-engagement projections will not interfere with the release of the clutch even if they have dug slightly into the material of the housing.

It has been found that the use of shaped springs as restoring force-generating elements to center the intermediate plate and the pressure plate in the housing and also the use of compression springs to control the separation between the flywheel and the intermediate plate and between the intermediate plate and the pressure plate are not optimal, because the functions they serve are affected by the rotational speed of the components. In addition, the known designs are relatively complicated and thus are also expensive to manufacture.

A need, therefore, exists for a pressure plate assembly provided with separation control performed by the releasing spring arrangement and/or the positioning of the plate arrangement in the housing which is affected less strongly by centrifugal force and is less dependent on rotational speed.

Still another need exists for a pressure plate assembly that has a simple mechanical design and thus can be produced at low cost.

SUMMARY OF THE INVENTION

To accomplish these tasks, it is proposed in accordance with the first aspect of the invention that at least one of the plates of the plate arrangement be held in the housing and/or supported at least radially and/or supported so as to prevent relative rotation by the releasing spring arrangement acting between this plate and the housing. The releasing spring arrangement can act directly or indirectly between the plate in question and the housing. In particular, the idea is that at least one of the plates of the plate arrangement is held in the housing or supported at least radially and/or supported so as to prevent relative rotation by the releasing spring arrangement acting between this plate and the housing or between the plate and at least an intermediate part assigned to the housing which is or can be permanently connected to the housing.

According to the inventive proposal, the releasing spring arrangement serves not only to control the separation between, for example, a flywheel serving as the abutment arrangement on the one side and—if provided—between the intermediate plate and the pressure plate on the other side, but also to hold at least one plate of the plate arrangement, such as the pressure plate and/or the intermediate plate, in the housing or to support it at least radially and/or to support it so as to prevent relative rotation. The releasing spring arrangement thus has a double function and eliminates the need for separate support elements to provide radial support or to prevent relative rotation. In particular, it is possible to eliminate the shaped springs used in the previously mentioned state of the art to center the intermediate plate or the pressure plate in the circumferential direction with respect to the housing. This leads to significant cost advantages, and it is also possible to design the releasing spring arrangement in such a way that the effects of centrifugal force are at least less pronounced than in the previously mentioned state of the art.

One of the particular ideas of the invention is to connect at least one of the plates of the plate arrangement, especially the pressure plate and—if provided—at least one intermediate plate either directly or indirectly via the releasing spring arrangement to the housing or to the intermediate part.

According to a second aspect of the invention, it is proposed as an elaboration of the pressure plate assembly according to the first aspect and also independently thereof according to the originally described pressure plate assembly that the releasing spring arrangement comprise a plurality of releasing springs in the form of leaf springs, especially tangential leaf springs, one end of which acts on or is attached to the associated plate of the plate arrangement, while the other end acts on or is attached to the housing or at least to an intermediate part which is assigned to the housing and which is or can be permanently connected to the housing or to another plate of the plate arrangement.

Releasing springs designed in this way have been found to give good results generally in friction clutches, and it is very easy to design and to install the releasing spring arrangement in such a way that the centrifugal forces which occur during operation have little or no effect on the operating behavior. In particular, the leaf springs can be arranged and attached in such a way that the friction, if any, which occurs during a clutch-engaging or clutch-releasing operation is independent of the rpm's, i.e., of centrifugal forces. In addition, releasing springs in the form of leaf springs, especially tangential leaf springs, can be manufactured and installed—by riveting, for example—at low cost.

The main idea is that the pressure plate or at least the pressure plate is held in the housing by the releasing spring arrangement or at least supported radially and/or supported in such a way that relative rotation is prevented. In particular, the pressure plate can be effectively centered in the housing by the releasing spring arrangement, especially by a tangential leaf spring a arrangement, so that there is no imbalance.

It has already been suggested that the plate arrangement can include an intermediate plate, which is able to rotate along with the housing around the axis of rotation and to shift with respect to the housing in the direction in which the axis of rotation extends, and which is installed axially between the abutment arrangement and the pressure plate. For this purpose, it is proposed as an elaboration that the intermediate plate be held in the housing by the releasing spring arrangement or at least supported radially by it or supported in such a way as to prevent relative rotation. In particular, the intermediate plate can be effectively centered in the housing to avoid imbalance by the releasing spring arrangement, especially by a tangential leaf spring arrangement.

A preferred embodiment is characterized in that the intermediate plate is held in the housing or at least radially supported and/or supported so as to prevent relative rotation by the releasing springs of the releasing spring arrangement acting between the intermediate plate and the housing or the intermediate part. In this connection it is preferred that the pressure plate be held in the housing or at least supported radially and/or supported so as to prevent relative rotation by the releasing springs of the releasing spring arrangement acting between the intermediate plate and the pressure plate.

It is well within the scope of consideration, however, for the pressure plate to be held in the housing or at least supported radially and/or supported so as to prevent relative rotation by the releasing springs of the releasing spring arrangement acting between the housing and the pressure plate. It would then be possible for the intermediate plate to be held in the housing or at least radially supported and/or supported so as to prevent relative rotation by the releasing springs of the releasing spring arrangement acting between the intermediate plate and the pressure plate.

It can be guaranteed with a high degree of certainty that the arrangement will operate satisfactorily if, during an axial displacement in the housing, at least one plate of the plate arrangement, especially the pressure plate and/or the intermediate plate, is guided by the releasing spring arrangement in a defined manner relative to the housing at least in the radial direction and possibly in the direction of relative rotation and preferably in such a way as to prevent the plate from tipping relative to the housing. By providing this type of guidance for the plate or plates, it is possible in particular to prevent any direct positive engagement between the plate in question and the housing and accordingly to prevent any friction directly between the plate in question and the housing. In cases where the previously mentioned leaf springs, especially tangential leaf springs, are used, the axial displacement of the plate in question can easily tolerate a certain rotation of the plate relative to the housing.

The essential idea is to design the releasing spring arrangement in such a way that a significant portion of the torque which is to be transmitted in a motor vehicle friction clutch during operation between the plate arrangement and the abutment arrangement on one side and the clutch disk arrangement to be clamped between the first two arrangement on the other side is transmitted between the housing and the plate arrangement by the releasing spring arrangement, and also so that, in the case of a friction clutch, especially a multi-disk clutch, with a pressure plate assembly, a significant portion of the torque to be transmitted during operation between the drive unit (especially an internal combustion engine) on one side and the transmission on the other side is in fact transmitted via the releasing spring arrangement. It is proposed specifically for this purpose that the releasing spring arrangement be designed so that at least 25%, preferably at least 50%, most preferably at least 75%, of the torque to be transmitted is transmitted between the housing and the plate arrangement. In fact, the idea is that, in a friction clutch of the type in question, at least 25%, preferably at least 50%, most preferably at least 75%, of the torque to be transmitted between the drive unit (especially an internal combustion engine) on one side and the transmission on the other side is transmitted at least in certain operating states via the releasing spring arrangement. For example, in the case of a dual disk clutch, 25% of the engine torque can be transmitted directly between the abutment arrangement and the one clutch disk, and 75% of the engine torque transmitted between the clutch disks and the housing can be transmitted via the releasing spring arrangement between the housing on the one side and the pressure plate and the intermediate plate on the other side.

It is preferred to design the releasing spring arrangement in such a way that it acts as a damper with respect to displacements of the plate arrangement relative to the housing. In elaboration of this idea and also in general, it is also proposed that the releasing spring arrangement comprise a plurality of leaf spring packages, each of which has several leaf springs, especially tangential leaf springs, layered axially on top each other, one end of which acts on or is attached to the plate in question of the plate arrangement, while the other end acts on or is attached to the housing or to the intermediate part or to another plate of the plate arrangement. In the first case just mentioned, the friction between the leaf springs of the individual leaf spring package can provide the damping action of the releasing spring arrangement.

It is especially desirable for all of the leaf springs or leaf spring packages acting on or attached at one end to a certain plate of the plate arrangement and at the other end to the housing or the intermediate part or a certain other plate of the plate arrangement to form a group of leaf springs or leaf spring packages, the leaf springs or leaf spring packages of which have the same effective free bending lengths and preferably the same stiffnesses. It is ensured as a result that the plate in question, even during the actuation of the clutch, will retain the desired nominal orientation relative to the axial direction, especially an orientation in which its active friction surface or friction surfaces are at a right angle to the axial direction or in which the plate interacts uniformly by way of its friction surface or frictional surfaces with the associated clutch disk or an associated friction lining unit. As a rule, it will be provided that all of the leaf springs or leaf spring packages of an individual group will have the same force-distance characteristic.

In elaboration of the above, it is proposed that the leaf springs or leaf spring packages of a first group, which at one end act on or are attached to a certain plate of the plate arrangement and at the other end act on or are attached to the housing or to the intermediate part, and the leaf springs or leaf spring packages of a second group, which at one end act on or are attached to the certain plate of the plate arrangement and at the other end act on or are attached to a certain other plate of the plate arrangement, have the same effective free bending lengths and preferably the same stiffnesses. In this way, it is easy to achieve the desired relative axial positioning of the plates and to preserve that positioning, even when the clutch is being actuated. For example, it is possible for the intermediate plate to be centered precisely at all times axially between the pressure plate and the abutment arrangement, even when the actuation of the clutch causes the axial distance between the plates to change. It is therefore possible to ensure or at least to improve the uniformity of the interaction between all of the frictional surfaces of the plates and their associated clutch disks or friction lining units. If more than one intermediate plate is provided and if, accordingly, more than two groups of leaf springs or leaf spring packages can be identified, it is preferable for all of the leaf springs or leaf spring packages of all groups to have the same effective free bending lengths and preferably the same stiffnesses. It is especially desirable for the leaf springs or leaf spring packages of the first group and the leaf springs or leaf spring packages of the second group, preferably the leaf springs or leaf spring packages of all the groups, to have the same force-distance characteristics.

It is advantageous for the releasing springs of the releasing spring arrangement, especially the leaf springs, to be permanently attached, preferably riveted, at one end to the plate in question of the plate arrangement and to be permanently attached, preferably riveted, at the other end to the housing or to the intermediate part or to another plate of the plate arrangement.

With respect to the housing, it is proposed in general that the housing have support sections, which extend in the axial direction essentially between the abutment arrangement and the energy storage device, cover the plate arrangement radially on the outside, are distributed around the circumference of the housing, and form the boundaries of openings, where the energy storage device is or can be supported directly or indirectly on these support sections. In this context, the essential idea is that the housing has support sections which project in the axial direction from the abutment arrangement toward the energy storage device, cover the plate arrangement radially on the outside, are distributed around the circumference of the housing, and form the boundaries of openings, where the energy storage device is or can be supported directly or indirectly on these support sections, or that the housing has support sections which project in the axial direction from the energy storage device the toward abutment arrangement, cover the plate arrangement radially on the outside, are distributed around the circumference of the housing, and form the boundaries of openings, where the energy storage device is or can be supported directly or indirectly on these support sections.

The plate or plates of the plate arrangement can have plate sections which project radially into the openings. This design, however, is preferably not intended to transmit torque between the plate or the plates on and the housing but rather to make effective use of the space available in the radial direction. In this context, the idea is that the releasing spring arrangement will act on at least some of the radially projecting plate sections. It is then possible, for a given diameter of the housing, to provide clutch disks with a comparatively large radius and, accordingly, a comparatively large effective friction surface.

It should be noted here that the radially projecting plate sections can have different axial thicknesses and/or an axial thickness which is less than that of the plate in question. The radially projecting sections of a plate or a group of radially projecting sections of a plate can have an axial thickness different from that of the radially projecting sections of another plate or of the radially projecting sections of a group of the other plate. Ultimately, the axial thickness of the plate sections is not crucial. The main idea here is that an axially oriented surface of a certain section of the plate can be axially offset from the axially oriented friction surface of the plate itself. The especially important idea in this context pertains to the radially projecting plate sections on which the releasing springs of the releasing spring arrangement, especially leaf springs (possibly tangential leaf springs) or leaf spring packages, act. If the releasing springs act on a surface of the radially projecting plate section which is axially offset from the friction surface, it is possible to compensate for an axial offset of the connection between the releasing springs in question and the opposing friction surface.

In more concrete terms, it is proposed in particular that an essentially axially oriented surface, especially a releasing spring fastening surface, of at least one of the radially projecting plate sections be axially offset from the essentially like-oriented friction surface of the plate carrying the plate section in question. By way of elaboration, it is also proposed that the axial space obtained as a result of the different axial thickness of the radially projecting plate sections and/or as a result of the axial offset of the surface of the section from the friction surface be used to provide the same bending lengths for all of the releasing springs, designed as leaf springs, especially tangential leaf springs, of the releasing spring arrangement.

To prevent the plates from tilting relative to the housing, it is proposed in a further elaboration that at least three openings preferably distributed equal distances apart around the circumference accommodate releasing springs of the releasing spring arrangement. For example, at least three openings distributed equal distances apart around the circumference can accommodate releasing springs acting between the intermediate plate and the housing. In addition, at least three openings distributed equal distances apart around the circumference can accommodate releasing springs acting between the pressure plate and the intermediate plate. It is especially preferable for the individual opening to accommodate both a releasing spring acting between the intermediate plate and the housing and also a releasing spring acting between the intermediate plate and the pressure plate.

It should be noted that it can also be quite effective for at least three openings distributed equal distances apart round the circumference to accommodate releasing springs acting between the pressure plate and the housing. For a design of this type, it is preferable for the opening in question to accommodate both a releasing spring acting between the pressure plate and the housing and also a releasing spring acting between the intermediate plate and the pressure plate.

The releasing springs permanently attached to the housing can be permanently attached, preferably riveted, to a housing wall which is connected to the support sections of the housing, this housing wall being attached to or made as an integral part of the support sections. In this relation the idea (but not the exclusive idea) is that the housing wall in question will be formed by the abutment arrangement or that the wall will carry this arrangement. As a rule, it will be advisable for the releasing springs attached to the housing wall to be attached to the side of the housing wall which faces the plate assigned to the releasing springs. It is also quite possible, however, for the releasing springs to be installed on a fastening surface of the housing wall which faces away from the plate assigned to the releasing springs. In this way, it is possible to make especially efficient use of the axial space available, and/or the design will occupy a comparatively small amount of space in the axial direction.

In accordance with another highly effective embodiment, each of the releasing springs permanently attached to the housing is permanently attached, especially riveted, to a support section of the housing or by means of a support section of the housing. For this purpose, it is proposed as an especially advantageous elaboration that the releasing springs attached to their individual support sections be attached to a fastening surface of the support section in question which faces away from the plate assigned to the releasing springs. Especially effective use can thus be made of the axial space available, and/or the design will occupy a comparatively small amount of space in the axial direction. The possibility that the fastening surface in question could face the plate assigned to the releasing springs should not, however, be excluded. An attachment of the releasing springs in question to a fastening surface of the associated support section which faces the plate assigned to the releasing springs can even offer special advantages and make it possible, for example, to provide in a simple manner the same effective free bending lengths for all of the releasing springs designed as leaf springs, especially tangential leaf springs.

In accordance with a design variant, at least one intermediate part is permanently attached, especially riveted or screwed, to at least one of the support sections of the housing, to which intermediate part the releasing springs are permanently attached, especially riveted. In this case, it is advantageous for the releasing springs attached to the intermediate part to be attached to a fastening surface of the intermediate part which faces the plate assigned to the releasing springs.

Again with respect to the design of the housing with support sections which form the boundaries of openings, a further elaboration is proposed according to which the energy storage device is or can be supported on plate sections of the pressure plate which project radially into the openings. This design also makes effective use of the space available in the radial direction. In particular, the lever arms of the energy storage device can be made quite long.

The plate sections of the pressure plate projecting radially into the openings can, as known in and of itself, be designed with axially projecting support ribs, possibly support blades, for the energy storage device. The energy storage device is preferably designed as a diaphragm spring arrangement. In this context, the idea is that the energy storage device will comprise at least one diaphragm spring, and that the ring section of the diaphragm spring or—preferably—spring tabs projecting radially from the ring section of the diaphragm spring are or can be supported on the sections of the pressure plate which project into the openings, especially on the support ribs of those sections. The design with radially projecting spring tabs is especially advantageous, because it leads to long lever arms. It is also possible in this way to exert an advantageous influence on the effective spring characteristic.

As known from U.S. Pat. No. 6,409,002, the energy storage device can be installed outside the housing. In this context, the main idea is that the energy storage device is or can be supported on a housing wall, possibly the bottom part of the housing or the housing cover part, which is located axially between the energy storage device and the plate arrangement and which is connected to the support sections of the housing, i.e., either attached to these sections or forming an integral part of them. The housing wall can, for example, be screwed or riveted to the support sections. In addition, the housing can be designed as a one-piece unit, integral with the abutment arrangement, which is preferably designed as a flywheel. The flywheel could from a certain standpoint be considered the bottom part of the housing.

Another possibility is to design the housing wall against which the energy storage device is or can be supported as a one-piece unit with or as an integral part of the support sections. In addition, the housing is or can be screwed or riveted to the abutment arrangement, designed preferably as a flywheel. It is advantageous for the support sections to be designed so that they can be screwed or riveted to the abutment arrangement. The flywheel could also be considered a housing cover.

It is proposed by way of elaboration that each of the support sections have a support surface facing the abutment arrangement by which the section rests flat against one side of the abutment arrangement or is at least supported flat against it directly or indirectly. It is possible to provide the support surface on a projecting, flange-like, foot section of the support section. The main idea here is that the foot section projects radially outward from an axial bridging section of the support section in question. With respect to the attachment of the releasing springs, it is proposed that the releasing springs attached permanently to the housing be attached to the associated foot sections or by means of the associated foot sections or that they be attached to projecting, flange-like fastening sections axially offset from the foot sections.

An advantageous embodiment is characterized in that the housing-side terminal sections of the releasing springs permanently attached to the housing are accommodated axially between the support surface of the associated foot section on one side and the abutment arrangement on the other side and preferably provide axial support for the associated support section against the abutment arrangement. The releasing springs in question, preferably designed as leaf springs or tangential leaf springs, can be provided with a housing-side terminal section which is longer than its other terminal section; this lengthened terminal section can then serve as a shim, so to speak, for the associated foot section of the housing. It is preferred that releasing springs or releasing spring packages not be assigned in this way to all of the support surfaces or foot sections. It is proposed by way of elaboration in this regard that the first group of support sections, i.e., those to which releasing springs are not assigned, be longer in the axial direction than the second group of support sections, i.e., to which releasing springs are assigned.

Another idea specifically associated with the embodiment described above is that the axial space obtained as a result of the arrangement of the housing-side terminal sections of the releasing springs axially between the support surface of the associated foot section on one side and the abutment arrangement on the other side, and/or as a result of the different axial lengths of the support sections, can be used to provide the same bending lengths for all of the releasing springs, designed as leaf springs, especially as tangential leaf springs of the releasing spring arrangement.

With respect to the ways in which the intermediate part—at least one of which will be provided—can be designed, the basic idea is that the housing or the support sections on one side and the abutment arrangement on the other side will hold the intermediate part axially between them. It is also intended that the housing or the support sections, the abutment arrangement, and the intermediate part are or can be screwed or riveted to each other. A ring-shaped part or several web parts offset from each other in the circumferential direction, possibly in the form of segments of a ring, can be provided as the intermediate part or intermediate parts.

It should also be pointed out that ultimately it is completely arbitrary whether, in the case of the design variant with the minimum of one intermediate part, this part is considered a component which is separate from the housing or, alternatively, as a subcomponent or a set of subcomponents of a housing of a corresponding multi-part design. Without the intention of limiting its generality, the minimum of one intermediate part is discussed here as a component which is, or as a set of components which are, separate from the housing.

It is also ultimately completely arbitrary whether the abutment arrangement, possibly formed by a flywheel, is considered a component separate from the housing or, alternatively, as a subcomponent of a housing of corresponding multi-part design, which possibly also comprises the minimum of one intermediate part. With respect to some of the ways in which the inventive pressure plate assembly can be designed, the abutment arrangement, possibly the flywheel, is discussed here, without the intention of limiting its generality, as a component which is, or as a set of components which are, separate from the housing.

In accordance with a third aspect, the invention pertains to a clutch disk arrangement for a friction clutch designed as a multi-disk clutch configured with hub element which is fixedly mounted to a shaft. The hub element is operatively connected to the carrier arrangement by means of a torsional vibration damper arrangement including a central disk element that is attached to the hub element, two cover disk elements sandwiching the central disk element so as to rotate at least to a limited degree relative to the hub element, and a damping and/or spring element arrangement between the central disk element and the cover disk elements. The carrier arrangement is configured with first and second carrier elements. The first carrier element is coupled to the hub element via the torsional vibration damper arrangement and fixed to one of the cover disk elements, which is in turn is provided with a first friction lining unit. The second carrier element is connected via the torsional vibration damper arrangement to the hub element and is provided with a second friction lining units. The first and second carrier elements are rotatably fixed, but axially displaceable relative to one another.

A clutch disk arrangement of this type is known from U.S. Pat. No. 6,793,058. Reference is made to FIG. 8 of that document. In the known clutch disk arrangement, the second carrier element is arranged so that can shift position relative to the first carrier element in the same direction as that in which the axis of rotation extends, where a set of external teeth on the first carrier element meshes with a set of internal teeth on the second carrier element. The two carrier elements are each designed in the form of cups, and the external teeth of the first carrier element and the internal teeth of the second carrier element are formed on certain areas of their circumferential walls. These circumferential wall areas, which project in the axial direction, serve to bridge an axial gap, the size of which depends on the minimum axial distance between the friction lining units. The known dual clutch disk therefore occupies a comparatively large amount of radial and axial space radially inside the friction lining units; this space must be factored into the design on either the engine side or on the transmission side, and if it is factored in on the transmission side, it is also necessary to take into account the actuation of the clutch during a clutching operation with respect to, for example, the depth to which the spring tongues of a diaphragm spring serving as the energy storage device must descend.

Against this background, the task of the invention, according to its third aspect, is to provide a clutch disk arrangement of the type described above which is designed in such a way as to promote the optimal utilization of the available space. To accomplish this task, it is proposed that the second carrier element be connected or connectable to the first carrier element via the torsional vibration damper arrangement.

Because the second element is or can be connected to the first carrier element via the torsional vibration damper arrangement, the torsional vibration damper arrangement can at least cooperate in the task of bridging the axial distance between the two carrier elements, so that, to this extent, it is no longer necessary for one or both of the carrier elements to project in the axial direction. It is necessary only to ensure, through the appropriate design of at least one of the elements connecting the second carrier element to the first carrier element or through the design of the first and/or of the second carrier element itself, that the two carrier elements can shift position relative to each other in the same direction as that of the axis of rotation to obtain a connection suitable for producing rotation in common.

The essential idea is that the second carrier element is or can be connected nonrotatably to the other cover disk element but with the freedom to shift position with respect to that other element essentially in the same direction as that of the axis of rotation. With respect to the first carrier element, it is preferable that this element be formed by one of the cover disk elements, and that this cover disk element be nearly flat or only slightly cupped and preferably comparatively thin.

In elaboration it is proposed that one of the group of elements consisting of the second carrier element and the other cover disk element or an intermediate carrier element permanently connected to the other cover disk element has an essentially radially outward-directed first engagement formation, preferably a set of external teeth, and that the other element has an essentially radially inward-directed second engagement formation, preferably a set of internal teeth, which is or can be brought into engagement for rotation in common with the first engagement formation. The first and second engagement formations make it possible for the second carrier element to shift position axially with respect to the first carrier element. In this regard, it is especially advantageous for the two engagement formations, as already mentioned, to have their own sets of teeth (external teeth, internal teeth), where at least one of these sets of teeth extends a certain distance in the same direction as that in which the axis of rotation extends. The set or sets of teeth must extend in the same direction as the axis of rotation, however, only far enough to allow the relative axial displacement between the two carrier elements which occurs during operation while reliably maintaining the connection for rotation in common between them regardless of the axial distance between the first carrier element or its friction lining unit and the second carrier element or its friction lining unit.

It is advantageous for at least one element of the group consisting of the second carrier element and the other cover disk element or the intermediate carrier element permanently connected to the other cover disk element to be designed essentially in the form of a cup, where a circumferential wall area of this element carries the first or second engagement formation (possibly a set of external or internal teeth). Both elements can have this cup-like formation, but it is preferable for only one of the two elements to be designed as a cup with a circumferential wall area, whereas it is advantageous for the other element to be in the form of an essentially flat or nearly flat disk part. The essential idea here is that the second carrier element is formed by an essentially flat (or nearly flat) ring-shaped disk part, which is preferably in rotational engagement by its internal teeth with a set of external teeth on the circumferential wall area of the cover disk element or of the intermediate carrier element.

According to a fourth aspect, the invention provides a friction clutch with an inventive pressure plate assembly and a clutch disk arrangement, which can be clamped between the abutment arrangement and the plate arrangement. In the case of a multi-disk clutch, the clutch disk arrangement can be clamped between the abutment arrangement and an intermediate plate or the intermediate plate or between two intermediate plates or between an intermediate plate or the intermediate plate and the pressure plate. Each individual disk of the clutch disk can therefore be clamped between two of the above-mentioned components. The abutment arrangement can be an integral or one-piece part of the housing of the pressure plate assembly. According to another possibility, the abut arrangement can be designed as a component which is separate from the housing of the pressure plate assembly.

What is provided in particular is a friction clutch in the form of a multi-disk clutch, in which the clutch disk arrangement includes a hub element fixed to the shaft, and a carrier arrangement for coupling at least two friction lining units to the hub element. The carrier arrangement is configured with first and second carrier elements provided with the respective friction lining units and coupled to the hub element so that the first and second carrier elements are rotatably fixed to, but axially displaceable relative to one another.

The clutch disk arrangement can also be a arrangement according to one of the design variants found in U.S. Pat. No. 6,793,058.

What is also provided in particular is a friction clutch in the form of a multi-disk clutch, in which the clutch disk arrangement is configured with a hub element fixed to the shaft, a carrier arrangement, and a torsional vibration damper arrangement. The carrier arrangement has first and second carrier elements provided with respective friction linings and coupled to the vibration damper so that these carrier elements are rotatably fixed, but axially displaceable relative to one another.

The basic idea here is that, in accordance with the third aspect of the invention, the second carrier element is or can be connected via the torsional vibration damper arrangement to the first carrier element. The clutch disk arrangement can be designed in the form of one of the various elaborative proposals explained above.

In particular, the invention also provides a friction clutch which, in the assembled state, represents a ready-to-install module, which can be installed in a motor vehicle power train between the drive unit (especially an internal combustion engine) and a transmission. The basic idea in this context is that the clutch disk arrangement represents a module which is essentially ready to function when installed between the abutment arrangement and the plate arrangement, possibly between the abutment arrangement and the intermediate plate or between two intermediate plates or between the intermediate plate and the pressure plate.

The invention also provides a friction clutch which, in the assembled state, represents a ready-to-install module consisting of the clutch disk arrangement and the pressure plate assembly and a component separate from the module, namely, an abutment arrangement, preferably in the form of a flywheel, both of which can be installed in a motor vehicle power train between a drive unit (especially an internal combustion engine) and a transmission. The basic idea in this context is that the clutch disk is essentially functional or completely functional only after it has been installed in the motor vehicle power train between the abutment arrangement and the plate arrangement, possibly between the abutment arrangement and an intermediate plate or between two intermediate plates or between an intermediate plate and the pressure plate.

According to a fifth aspect, the invention provides a process for the assembly of an inventive pressure plate assembly or of an inventive friction clutch or of an inventive ready-to-install module. It is proposed for this purpose that, during this process, at least one plate of the plate arrangement be inserted into the housing and that it be connected to the housing by means of the releasing spring arrangement and possibly by means of at least one intermediate part.

An advantageous sequence of process steps is characterized in that, in a first assembly phase, releasing springs, especially tangential leaf springs, are connected, preferably riveted, to the housing, namely, to the sides of a bottom piece of the housing or possibly to the sides of the abutment arrangement; in that, next, a clutch disk of the clutch disk arrangement and then a plate of the plate arrangement are inserted into the housing; and in that, after this plate has been placed in the housing, it is connected, preferably riveted, to the releasing springs, which are connected to the housing on the sides of the bottom piece. The plate used in the first assembly phase can be an intermediate plate or the intermediate plate of the plate arrangement.

It is proposed by way of elaboration that, in a preparatory phase preceding a second assembly phase, optionally after or during or before the first assembly phase, releasing springs, especially tangential leaf springs, be connected, preferably riveted, to another plate of the plate arrangement; that, in the second assembly phase, another clutch disk of the clutch disk arrangement and then the additional plate of the plate arrangement be inserted into the housing; and that, after this additional plate has been placed in the housing, the plate inserted in the first phase is connected, preferably riveted, to the releasing springs connected to the additional plate. The plate used in the second assembly phase can be an additional intermediate plate or the pressure plate of the plate arrangement.

In the case of a multi-disk clutch with several intermediate plates, the second assembly phase can comprise a sub-phase for each intermediate plate and possibly for the pressure plate, during which an additional clutch disk of the clutch disk arrangement and then an additional plate of the plate arrangement are inserted into the housing. After the additional plate in question has been placed in the housing, the plate inserted in the first assembly phase or in the preceding sub-phase is connected, preferably riveted, to the releasing springs connected to the additional plate in question.

Once the plate arrangement has been completely installed in the housing to this extent, it is possible, in another assembly phase, especially in a third assembly phase, to close the housing on the side axially opposite the housing bottom piece by means of a housing wall (possibly a housing cover). The housing wall is preferably fastened permanently to a main housing part; in the case of a housing of appropriate design, the wall is attached preferably to the support sections which project from the abutment arrangement and which form the boundaries of the openings. For example, the housing wall can be screwed to the main housing part, possibly to the housing sections.

With respect to the housing wall, it is especially preferable for an energy storage device, possibly a diaphragm spring arrangement, to be connected, preferably riveted, to the housing wall during a preparatory phase preceding the additional or third assembly phase, possibly after or during or before the first assembly phase or, if desired, after or during or before the second assembly phase.

An alternative sequence of process steps pertaining especially to a different embodiment of the pressure plate assembly or of the friction clutch or of the ready-to-install module is characterized in that, in a first assembly phase, at least one plate of the plate arrangement and at least one clutch disk of the clutch disk arrangement are inserted into the housing. In the case of a multi-disk clutch, it is proposed that, in the first assembly phase, at least one clutch disk of the clutch disk arrangement be placed between two plates of the plate arrangement, possibly during the course of the insertion into the housing or preceding that insertion. By way of elaboration it is proposed that the plates between which the clutch disk is placed be connected to each other by means of releasing springs. This can be done before the insertion into the housing or only after the insertion into the housing.

It is also proposed by way of elaboration that, in a second assembly phase, a plate which has been inserted into the housing be connected to the housing by means of releasing springs and possibly by means of at least one intermediate part.

It is advantageous to connect, preferably to rivet, releasing springs, especially tangential leaf springs, to at least one assigned plate of the plate arrangement during a preparatory phase which precedes the second assembly phase, preferably the first assembly phase.

The invention also provides a friction clutch, possibly in the form of a ready-to-install module, which is assembled in accordance with the inventive process.

The invention is explained in greater detail below on the basis of the exemplary embodiments illustrated in the figures.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 8a shows an axial view of the other cover plate of the torsional vibration damper;

FIG. 8b shows a longitudinal cross section through this cover plate along line B-B in FIG. 8a;

FIG. 8c shows a partial longitudinal cross section through this cover plate along line C-C in FIG. 8a;

FIG. 17a shows a longitudinal cross section through a flywheel, serving as an abutment, to which the embodiment of FIGS. 11-16 could be attached;

FIG. 17b shows another embodiment of an inventive dual-disk friction clutch, which is to be considered a design variant of the embodiment of FIGS. 11-16, and which could be attached to the abutment arrangement according to FIG. 17a;

FIG. 19 shows a modification of the dual-disk clutch according to FIG. 18 in the form of a diagram similar to that of FIG. 18;

FIG. 20 shows another modification of the dual-disk clutch according to FIG. 18 in the form of a diagram similar to that of FIG. 18;

DETAILED DESCRIPTION OF THE PRESENTLY PREFERRED EMBODIMENTS

FIGS. 1-5 show an exemplary embodiment of a multi-disk clutch as a whole, including a plate arrangement, which has an intermediate plate and a pressure plate, a flywheel, which serves as the abutment and is part of a clutch housing; and a dual-disk clutch disk arrangement. The clutch disk arrangement itself is illustrated in detail in FIGS. 7-10.

The design and function of the friction clutch, specifically of its pressure plate assembly, can be understood especially easily on the basis of the content of U.S. Pat. No. 6,409,002, which for this reason is included by reference in the disclosure content of the present application. In the following explanations and in the figures, the same reference symbols as those appearing in U.S. Pat. No. 6,409,002 are used for components and elements which are analogous or identical to or which correspond to those of that document, except for the actual clutch disk arrangement itself.

The design and function of the clutch disk arrangement can be understood especially easily on the basis of the content of U.S. Pat. No. 6,793,058, which for this reason is included by reference in the disclosure of the present application. With respect to the clutch disk arrangement, the reference numbers used here for components and elements which are identical or analogous to or which correspond to those of U.S. Pat. No. 6,793,058 are the same as those appearing in that document except that they are raised by 1000.

Possible design variants of inventive friction clutches, pressure plate assemblies, and clutch disk arrangements can also be derived from U.S. Pat. Nos. 6,409,002 and 6,793,058.

Figure 6:
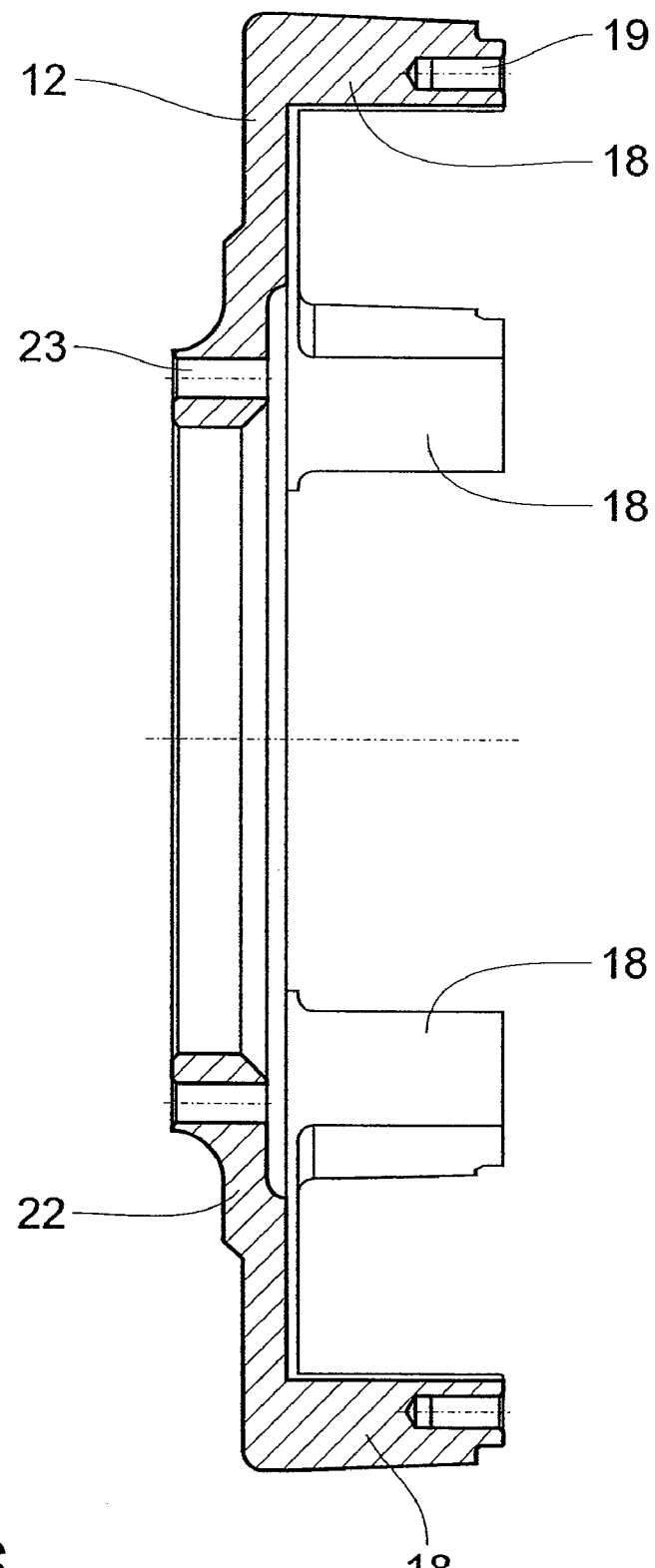
FIG. 6 shows a longitudinal cross section through a main clutch housing part, which is designed with a flywheel, serving as an abutment.

In the figures, the friction clutch shown by way of example is designated overall by the number 10. As can be seen, the friction clutch is designed as a multi-disk clutch, namely, as a dual-disk clutch, and comprises a clutch housing 12. An essential component of the clutch housing is a flywheel 22, which is designed so that it can be screwed to an engine takeoff shaft, either directly or by means of a torque-transmitting arrangement, possibly comprising a flex plate and/or a torsional vibration damper or a dual-mass flywheel, installed between the engine takeoff shaft and the clutch. Appropriate screw holes are designated by the number 23 in FIG. 6. The flywheel 22 is designed with web-like support sections 18, which are made as an integral part of the flywheel. A housing cover 14 is screwed to these support sections by screws 15. The screws are screwed into threaded holes 19 (FIG. 2) in the support sections 18, which will be referred to below as "housing webs". The cover 14 carries a diaphragm spring 34, which serves as an energy storage device and is permanently attached to the cover 14 by rivets 36. A support ring 42 is located between the cover 14 and the diaphragm spring 34, and a support ring 40 is located between the diaphragm spring 34 and the retaining heads 38 of the rivets; these rings are radially just outside the rivets and provide linear support for the diaphragm spring 34 against the cover 14 on one side and against the heads 38 of the rivets on the other and thus make it possible for the spring tongues 44 to pivot and release the friction clutch. The spring tongues 44 project radially inward, where they can be actuated by a clutch-release mechanism, only the release ring 45 of which is actually illustrated.

In the housing 12, a plate arrangement formed by a pressure plate 30 and an intermediate plate 32 is located in the volume formed between the flywheel 22 and the cover 14. Between the pressure plate 30 and the intermediate plate 32 there is a friction lining unit 1014 (FIG. 2), and between the intermediate plate 32 and the flywheel 22, serving as an abutment plate, there is a friction lining unit 1012 of a clutch disk arrangement 1010, which is designed with a torsional vibration damper 1106, which acts between the friction lining units and a clutch hub 1016. As will be explained in greater detail later on the basis of FIGS. 7-10, the friction lining unit 1012 located between the flywheel 22 and the intermediate plate 32 is attached to one of the cover plates of the torsional vibration damper, whereas the friction lining unit 1014 is designed with a driver ring 1048, which acts on a set of external teeth on the other cover plate 1094 of the torsional vibration damper so that it can transmit torque but is also free to shift position in the axial direction.

Figure 1:
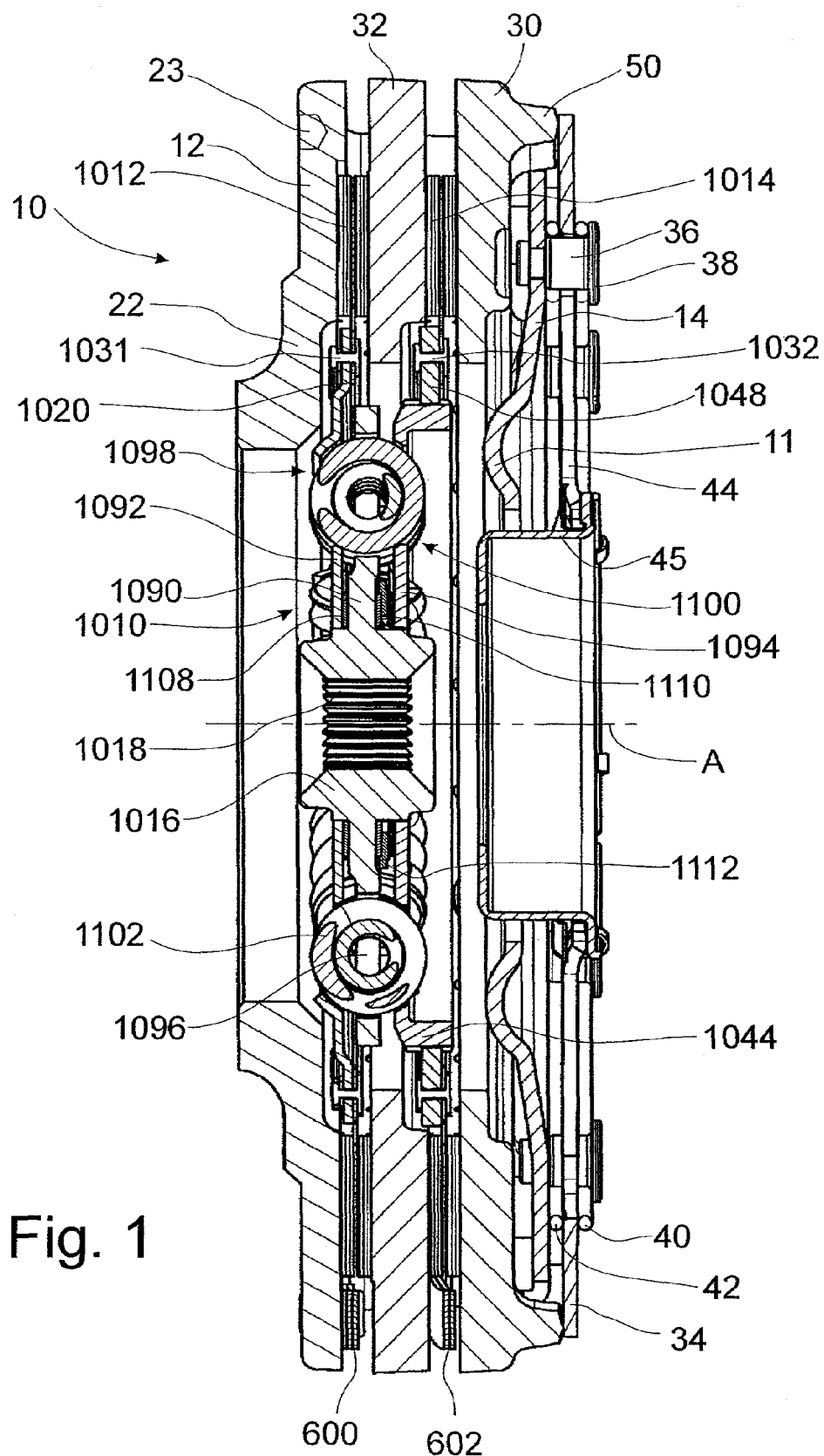
FIG. 1 shows a longitudinal cross section through an embodiment of an inventive dual-disk friction clutch.
Figure 2:
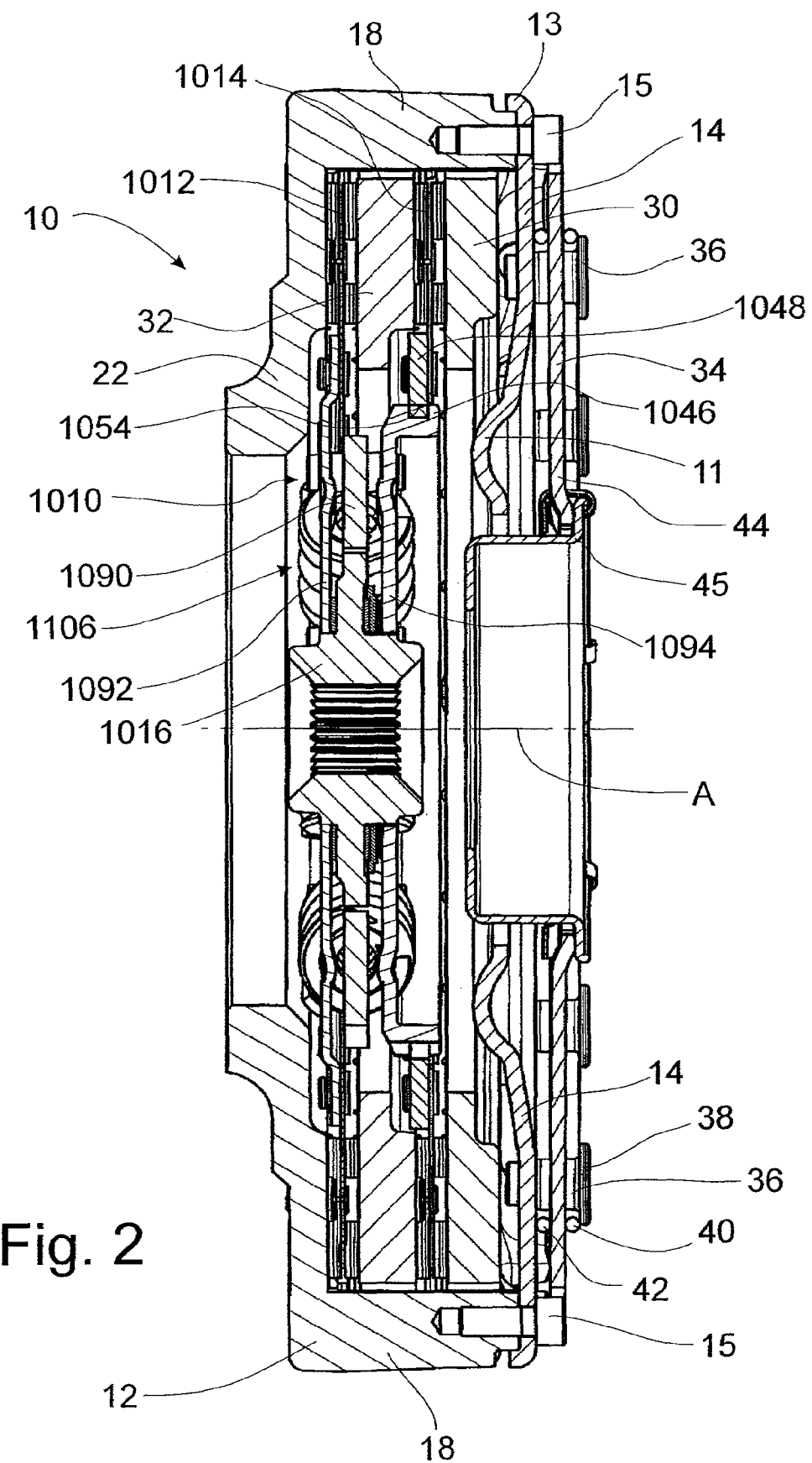
FIG. 2 shows another longitudinal cross section through the dual-disk friction clutch along a cross-sectional line offset by a certain angle from the line of FIG. 1.

The cover plates 1092, 1094, also referred to herein as cover disk elements, together with the driver ring 1048 serve as a carrier arrangement for the friction lining units. In FIG. 1, a section 1020 of the cover plate 1092 serves as a carrier element for the friction lining unit 1012.

The diaphragm spring 34 acts on the pressure plate 30 in such a way that the plate is pushed toward the flywheel 22. The friction lining units are then clamped between the pressure plate 30 and the intermediate plate 32 and between the intermediate plate 32 and the flywheel 22: the clutch is thus now engaged. When the spring tongues 44 are actuated by the releasing ring 45 (FIG. 2) and thus pushed toward the flywheel, at least some of the force acting on the pressure plate 30 can be released and the clutch partially or completely disengaged. A releasing spring arrangement, to be explained in greater detail below, pushes the pressure plate 30 and the intermediate plate 32 away from each other and also pushes the intermediate plate 32 and the flywheel 22 away from each other, so that the frictional engagement of the plate arrangement with the flywheel with the friction lining units is released, and the friction clutch is disengaged accordingly.

This disengagement is associated with a corresponding axial displacement of the friction lining unit 1014, which is being pushed by the intermediate plate 32, which is itself being pushed by the restoring force of the releasing spring arrangement toward the cover 34.

The diaphragm spring 34 is in direct engagement with the support ribs 50 (FIG. 3) of the pressure plate 30. Specifically, it is the tabs 37 (FIG. 3) of the diaphragm spring which are engaged with the support ribs. These tabs are situated in a circumferential segment located between two housing webs 18 and project from a ring-shaped section 35 of the diaphragm spring 34. Each of these spring tabs can be considered the opposing lever arm to the group of several spring tongues 44 (FIG. 1), to be considered lever arms, located in the same circumferential segment. To promote the exchange of air during the rotation of the clutch, the support ribs or support projections 50 of the pressure plate 30 can be arranged at a slant to a tangent to the circumference, which allows them to provide a cooling function in the manner of turbine vanes.

Figure 4:
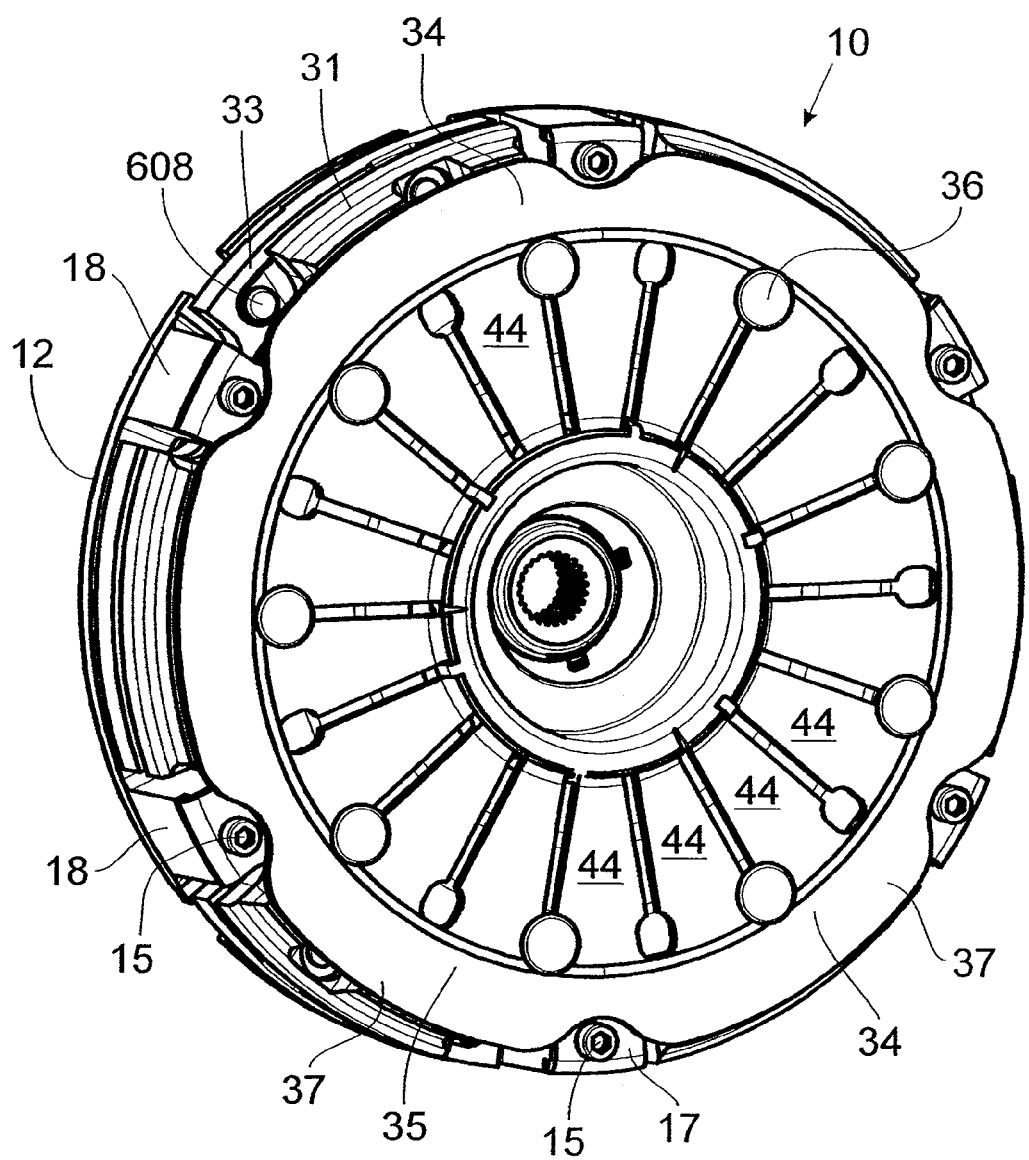
FIG. 4 shows another view of the dual-disk friction clutch.
Figure 5:
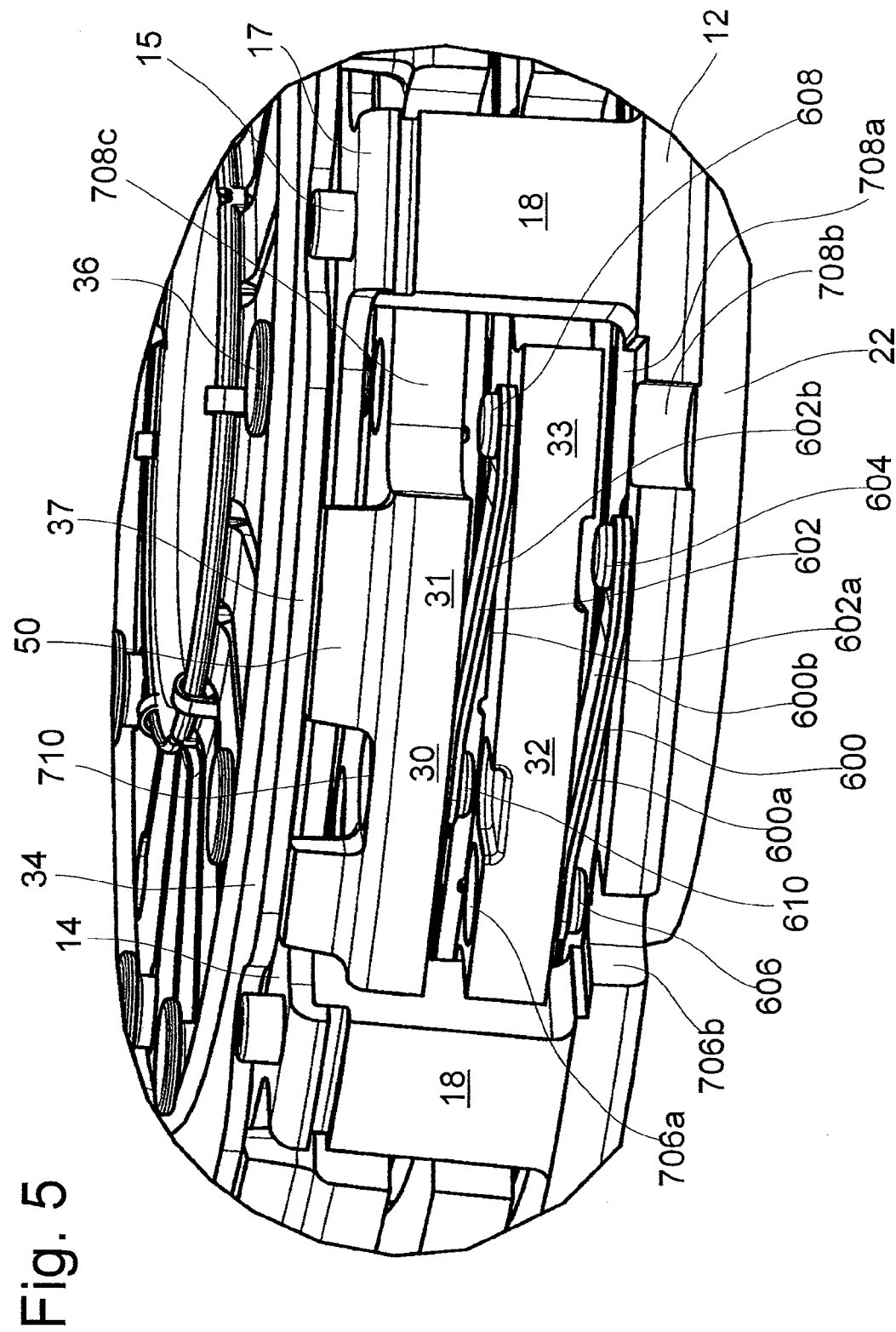
FIG. 5 shows an enlarged view of a circumferential area of the dual-disk clutch.

As can be seen especially in FIGS. 4 and 5, the cover 14 has radially projecting retaining tabs 17, which are attached by screws 15 to the housing webs 18. The spring tabs 37 of the diaphragm spring 34 engage with the support ribs 50 in the circumferential segment between the housing webs, where the spring tabs are coextensive in the radial direction with the housing webs 18 and the cover retaining tabs 17. Optimum use is thus made of the radial space available. That is, the engagement between the diaphragm spring and the pressure plate occurs radially outside the friction lining units in a radial space required in any case for the fastening of the cover. Because the fastening screws 15 are accessible between the diaphragm spring tabs 37, it is also possible to premount the diaphragm spring on the cover before screwing the cover to the housing webs 18.

Figure 3:
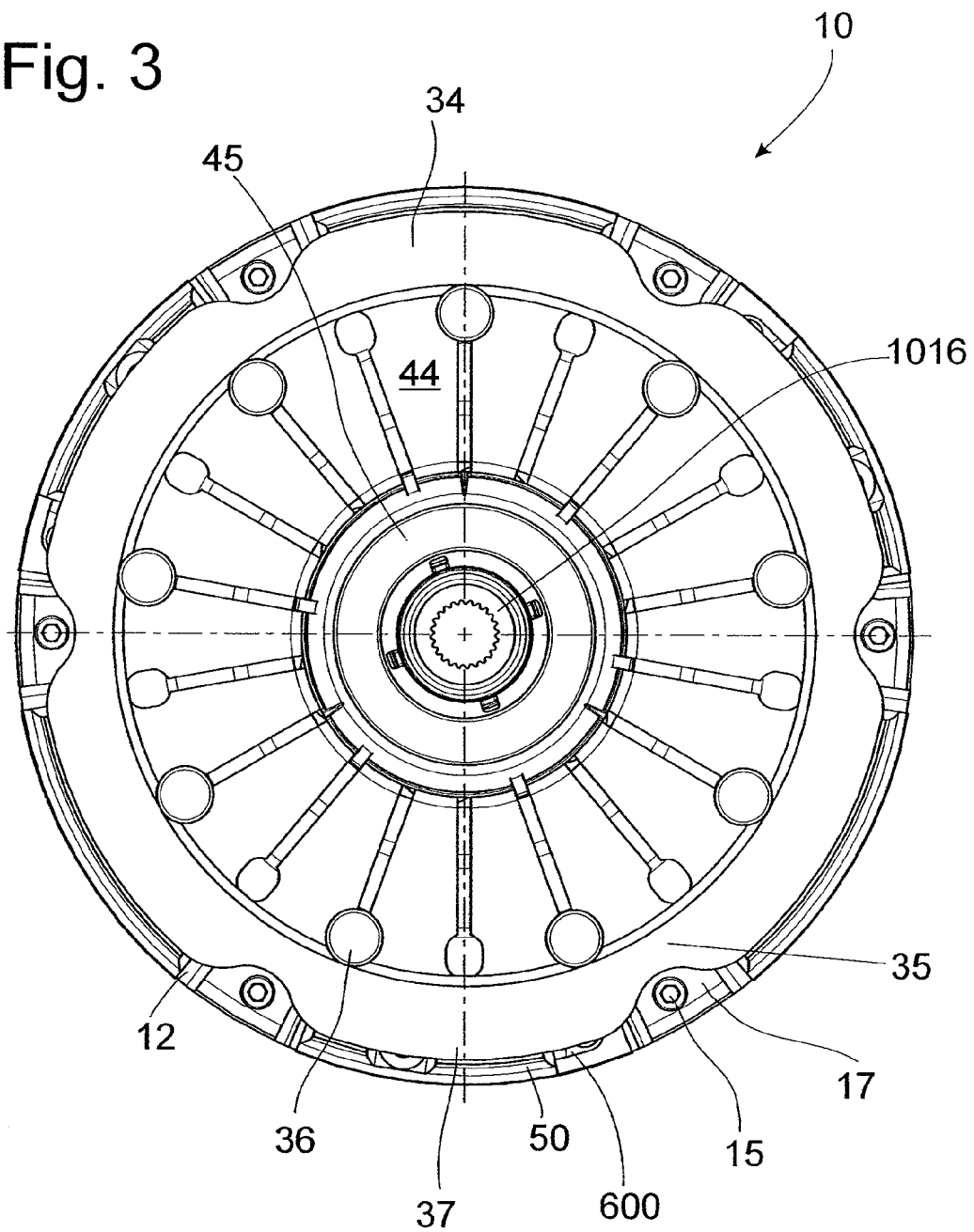
FIG. 3 shows an axial view of the friction clutch of FIGS. 1 and 2.

Parts of the releasing spring arrangement acting between the housing 12 and the plate arrangement 30, 32 can be seen in FIG. 5; supplementally, reference is made to FIGS. 1, 3, and 4. An open segment is provided between each pair of housing webs 18, which means that there is a total of six such openings; a plate section 31 of the pressure plate 30 and a plate section 33 of the intermediate plate 32 project radially into each opening. The projecting sections 31 of the pressure plate 30 are designed with support ribs 50. In the circumferential direction, every other open segment between the housing webs 18 is designed with releasing springs in the form of tangential leaf springs 600, which act between the housing and the radially projecting sections 33 of the intermediate plate 32 and are thus riveted at one end to an area of the flywheel 22 with the housing webs 18 and at the other end to the associated radially projecting section 33 of the intermediate plate 32, and tangential leaf springs 602, which act between the radially projecting sections 33 of the intermediate plate 32 and the radially projecting sections 31 of the pressure plate 30 and are thus riveted at one end to the associated radially projecting section 33 and at the other end to the associated radially projecting section 31 of the pressure plate 30. The rivets in question are designated by the numbers 604, 606, 608, and 610 in FIG. 5. So that the rivets 606, 608, and 610 can be set and thus the associated tangential leaf springs attached by riveting, openings or cutouts 706a, 706b are provided, respectively, in the pressure plate and in the radially projecting section 33 of the intermediate plate 32 for the rivet 606, and corresponding openings or cutouts 708a, 708b, and 708c are provided, respectively, in the flywheel 22, in the radially projecting section 33 of the intermediate plate 32, and between the radially projecting section 31 of the pressure plate 30 and the adjacent housing web 18 for the rivet 608; and an opening or cutout 710 interrupting the support rib 50 is provided in the radially projecting section 31 of the pressure plate 30. The points at which the associated rivets are inserted and then riveted by means of a suitable riveting tool are accessible through these openings or cutouts. It should be noted that the linear support which the support rib 50 gives to its associated diaphragm spring tab 37 is interrupted for only a very short distance in the circumferential direction. The interruptions by the openings or cutouts 710 and 708c required for riveting are selected so that this support by the support rib 50 is interrupted only briefly in each case, where several correspondingly short interruptions should be preferred to one long interruption.

The releasing spring arrangement therefore comprises three tangential leaf spring segments, distributed at equal angular distances apart around the circumference and assigned to the pressure plate 30 and the intermediate plate 32, and three other tangential leaf spring segments, distributed at equal angular distances apart around the circumference and assigned to the intermediate plate 32 and the housing. As shown in FIG. 5, the tangential leaf spring segments can have multiple layers. In the present example, each segment has two tangential leaf springs 600a, 600b; 602a, 602b, which lie directly on top of each other.

The tangential leaf spring segments serve not only as pure releasing springs but also as transmitters of the engine torque from the flywheel to the plate arrangement. The housing webs 18 accordingly have no torque-transmitting function and can thus be made correspondingly narrow in the circumferential and radial directions. Because the pressure plate 30 is in torque-transmitting connection with the flywheel 22 via the intermediate plate 32, that is, via the tangential leaf springs 602 and the tangential leaf springs 600, both the tangential leaf springs 600 and the tangential leaf springs 602 are located in the cutout areas defined by two housing webs 18, which means that the torque-receiving section 33 of the intermediate plate can transmit the torque to be transmitted to the pressure plate directly to the adjacent section 31 of the pressure plate via the tangential leaf springs 602, and there is therefore no need for any torque to flow through the intermediate plate to another radially projecting section 33.

The tangential leaf springs are designed in such a way that the same tangential leaf spring characteristics act in the axial direction both between the intermediate plate 32 and the pressure plate 30 and between the intermediate plate 32 and the flywheel 22. It preferable to use identical tangential leaf springs, so that the variety of parts can be reduced. During the clutch-engaging and clutch-releasing operations, the effect of having the same spring characteristics ensures that, with respect to the flywheel, the intermediate plate, and the pressure plate as well as the friction lining units located between them, the same separating forces and separating distances will occur; that the two friction lining units will be engaged at the same time and released at the same time; and that, overall, the clutching operation will take place in a comparatively short period of time. If the clutching operations were to occur one after the other or in a partially overlapping manner, an undesirable drag torque would be produced during the clutch-engaging and clutch-releasing operations, especially at the beginning of the engaging and releasing operations, and the engagement and release could occur over the course of two distinct stages, which is usually undesirable.

The flow of torque via the flywheel to the plates of the plate arrangement—under the assumption of the same effective friction values and friction surface areas—is such that 75% of the engine torque is transmitted via the tangential leaf springs 600 on the flywheel side and that 25% of the engine torque is transmitted via the tangential leaf springs 602 on the pressure plate side. It is assumed here that 25% of the engine torque is transmitted via each axial friction surface. 25% of the engine torque is therefore transmitted directly from the flywheel 22 to the friction lining 1012. 50% of the engine torque is transmitted from the intermediate plate 32 to the friction lining unit 1012 and to the friction lining unit 1014. The remaining 25% of the engine torque is transmitted from the pressure plate 30 to the friction lining unit 1014. The torque components to be transmitted from the intermediate plate 32 and the pressure plate 30 to the two friction lining units 1012 and 1014 therefore constitute 75% of the total torque and must be transmitted via the tangential leaf springs 600 from the flywheel 22 to the intermediate plate 32. One third of this, namely, 25% of the total torque, must then be transmitted from the tangential leaf springs 602 to the pressure plate 30. Although the tangential leaf springs 602 do not have to transmit as much torque as the tangential leaf springs 600, it is preferable to use identical tangential leaf springs for the same reasons as those mentioned above.

It should be remarked that, in principle, it would be possible to use spring arrangements different from the torque-transmitting releasing spring arrangements described above. One advantage of tangential leaf springs is that they make it possible for the pressure plate 30 and the intermediate plate 32 to be centered very accurately on the housing, especially on the flywheel 22, independently of the rpm's, which centering therefore avoids radial imbalance. In addition, the radially projecting sections 31 and 32 of the plates can also be centered or brought accurately into their desired nominal positions between the housing webs 18. The centrifugal forces acting on the releasing springs upon rotation of the clutch are absorbed effectively by the releasing springs, the narrow edges of which are pointing radially outward, without any significant effect on their elastic properties. That the axial movement of the intermediate plate and of the pressure plate during a clutch-engaging and clutch-releasing operation is accompanied by a slight rotation relative to each other and relative to the housing 18 presents no problem and must be taken into consideration only with respect to the dimensions of the tab-like plate sections 31, that is, with respect to their length in the circumferential direction and their positioning in the individual cutout areas.

If the releasing springs are to be riveted to the housing or to the plates in accordance with the present exemplary embodiment, a certain planned sequence of riveting steps has been found to be advisable for the assembly of a friction clutch of the type in question and possibly for the purpose of making available a complete module which can be installed in a motor vehicle power train. This riveting sequence coincides chronologically with the insertion of the clutch disk arrangement and/or of the friction lining units. It is proposed in particular that, first, the flywheel-side tangential leaf springs 600 be attached to the flywheel 22 by means of the rivets 604. Simultaneously, beforehand, or thereafter, the tangential leaf springs 602 are attached to the pressure plate 30 by means of the rivets 610. After these preparations, the flywheel-side clutch disk with the friction lining unit 1012, the torsional vibration damper 1106, and the clutch disk hub 1016 is now placed in the housing. Then the intermediate plate 32 is inserted and riveted to the previously attached tangential leaf springs 600 by means of the rivets 606. The connection between the flywheel 22 and the intermediate plate 32 is now permanent as a result of the rivets 604 and 606, and the tangential leaf springs 600 and cannot be removed without breaking the riveted joints. Next, the other friction lining unit 1014 with its driver ring is laid on the transmission-side friction surface of the intermediate plate 32 to produce a connection for rotation in common between the driver ring and the transmission-side cover plate of the torsional vibration damper 1106. Finally, the pressure plate 30 is introduced, which has already been equipped with the tangential leaf springs 602. Now the tangential leaf springs 602 are riveted to the intermediate plate 32 by the rivets 608, as a result of which the intermediate plate 32 and the pressure plate 30 are now connected to each other permanently and cannot be taken apart without breaking the riveted joints. The pressure plate 30 is thus also connected now to the flywheel 22.

So that the rivets can be accessed and set by the riveting tool, the flywheel 22, the intermediate plate 32, and the pressure plate 30 have axially aligned openings or cutouts for the associated rivets. The rivet in question can be introduced through these openings, and the selected riveting tool can fit through them to set the rivet. The openings or cutouts can be in the form of milled-out areas.

The openings in the flywheel and in the pressure plate are shaped in particular in such a way that the riveting tool such as a bolt can pass through the opening or past it from the side of the flywheel facing way from the clutch and thus act on the end of the rivet 606 or on the other end of the rivet 608. In the exemplary embodiment, cutouts 706b, 708b, and 708c, which are open radially toward the outside, are provided for this purpose in the pressure plate and in the flywheel. So that the intermediate plate 32 can be riveted to the flywheel 22, the axially oriented opening 706a, which is not open radially to the outside, is sufficient for the rivet 606; this opening is just large enough that the riveting tool can act on the end of the rivet 606 opposite the head 606. This opening will then be covered axially by the plate tab 31 of the pressure plate 30.

After the plates 32 and 30 have been arranged in the housing 12 and the riveting has been completed, the next step is to place the housing cover on the housing webs 18 and to screw the cover by its tabs 17 to the housing webs 18 by means of the screws 15. The diaphragm spring 34 is preferably already riveted permanently to the housing cover 14. The center of the diaphragm spring 34 has preferably been pushed in so that it corresponds to the released state. This has the advantage that the housing cover 14 and the housing webs 18 of the flywheel 22 can be connected to each other without the exertion or force or tension, because in this state the diaphragm spring makes little or no contact with the ribs 50 of the pressure plate 30 or comes to rest against these ribs only in the final phase of the screwing-together of the cover to the housing webs 18. In the case of a design for a clutch of the "Normally Closed" type, in which the diaphragm spring assumes by itself a position corresponding to the engaged state, the diaphragm spring can, during the installation of the housing cover, be held in a state corresponding to the disengaged state by means of an auxiliary tool, which deflects the diaphragm spring tongues toward the housing cover.

It should be remarked that it is also quite possible to connect the housing cover 14 to the rest of the housing, specifically to the housing webs 18, by a method other than screwing. In particular, it is also possible to provided a riveted connection. This is an especially effective variant in particular when, as in the case of the exemplary embodiment described here, the dual-disk clutch is provided by the manufacturer as a clutch module delivered in the assembled state, that is, as a ready-to-install module, which can simply be dropped into the power train and which, because of the riveting of the tangential leaf springs, cannot be taken apart except by destroying these riveted joints.

Several special features of the exemplary embodiment which have been only partially explained and additional details of the exemplary embodiment will be described in greater detail or presented in summary fashion below:

By concentrating both of the leaf spring connections in a single angular area of the opening, that is, between the superimposed tab-like projections of the pressure plate and intermediate plate, the torque which is to be transmitted via the intermediate plate to the pressure plate does not have to be conducted through the intermediate plate to another tab projection but rather can be conducted onward directly from this tab projection to the axially adjacent tab projection of the pressure plate. This prevents unfavorable stress peaks from developing in the cut-away areas of the intermediate plate which accept the associated housing webs 18 and which are bounded by two tab projections 33 adjacent to each other in the circumferential direction.

Through this concentration of both leaf spring connections within one of the individual open areas bounded by two housing webs, it is also ensured that the number of openings or cutouts for the riveting tool or tools is limited to the fewest possible areas between the housing webs. If, as in the exemplary embodiment, 6 housing webs 18 and thus six housing openings are provided, and if the intermediate plate and the pressure plate are each held in place by three tangential leaf spring arrangements, then only every second housing opening is equipped with tangential leaf springs, and accordingly the flywheel has the openings 606b and 708b only in every second housing opening area. As a result, the flywheel is kept comparatively stiff, and in particular stress concentrations or peaks which could be caused by the presence of openings on both sides of a housing web are avoided. The overall housing with the flywheel 22 and the housing webs 18 is therefore kept stiff, and a comparatively high bursting rpm value is obtained.

With respect to the amount of space available in the circumferential direction between the housing webs 18, the proposed sequence of riveting steps for the tangential leaf springs results in the largest possible contact surface or the longest possible edge along which the diaphragm spring can contact the ribs 50, which can also be called the "blades" of the pressure plate. As previously mentioned, the rib has two cutouts in the area where the tangential leaf springs 602 assigned to the pressure plate 30 itself are riveted. One of these two cutouts interrupts the support rib 50, while the other is enlarged appropriately in the circumferential direction to accommodate the adjacent housing web 18. Overall, the area where the rib 50 provides no support for the diaphragm spring is kept comparatively small.

The cam-like projections 33 and 31 of the intermediate plate 32 and the pressure plate 30 allow very efficient dissipation of heat from the intermediate plate and the pressure plate. For this reason, the pressure plate and the intermediate plate also have the plate tabs 33 and 31 in the other open segments between the housing webs 18 in which no tangential leaf springs are provided. The radially outward-facing surfaces of both plates can enter into heat-exchange contact directly with the environment, such as with the air flows occurring inside the clutch shroud, as a result of which the heat developed by the engaging and release operations is carried away. The housing tabs 33 and 31 are therefore designed with the largest possible surface areas between all of the housing webs 18 in order to achieve the best possible heat dissipation from the two plates. This ensures especially effective cooling for the intermediate plate and the pressure plate. There is therefore no need to design the pressure plate and the intermediate plate with a large heat capacity; these plates can thus occupy less space in the axial direction, for example, than would otherwise be desirable. This is of considerable advantage especially in the case of multi-disk clutches. With respect to the plate tab 33 of the intermediate plate 32, the goal is achieved by the proposed sequence of riveting steps that the plate tabs are not significantly reduced in their surface area by the riveting openings, which means that maximum heat dissipation is obtained for the plate tabs 33. The additional goal is achieved that the intermediate plate 32 is comparatively stiff in the area of the plate tabs 33; that is, it is not weakened by any openings or bores provided for riveting. Also in regard to the intermediate plate, harmful stresses are thus avoided, and a comparatively high bursting rpm value is achieved.

Through the design of the intermediate plate and of the pressure plate with plate tabs projecting between the housing webs 18, the intermediate plate and the pressure plate have the maximum degree of heat capacity for the given axial and radial construction space available under simultaneous achievement—as previously mentioned—of a very good heat dissipation toward the outside. Because essential mass components of the pressure plate and of the intermediate plate are located comparatively far out in the radial direction, furthermore, a comparatively large mass moment of inertia is obtained, which gives the friction clutch good no-load running behavior.

The radial overlap of the pressure plate ribs 50 and the tangential leaf springs radially outside the friction area of the clutch disk arrangement saves a large amount of radial space. The clutch disks can have a very large maximum diameter for a clutch of a given maximum diameter, and at the same time the diaphragm spring can also have a very large maximum diameter. It is also possible to obtain a diaphragm spring with a comparatively strong contact force and simultaneously a very long axial stroke at the blades (the support ribs 50) of the pressure plate blade for a given axial travel of the diaphragm spring tongues at the clutch-release mechanism. The diaphragm spring can extend over almost the entire radial dimension of the clutch housing, as shown in FIGS. 4 and 5. The spring tabs 37, which are defined by cutout areas in the diaphragm spring at the housing webs 18, act as lever-arm extensions of the diaphragm spring in the radially outward direction, as a result of which a lever action with a comparatively large free stroke is achieved, which is especially advantageous for multi-disk clutches, i.e., clutches with several clutch disks.

The design of the releasing spring arrangement and of the tangential leaf spring arrangement serving to transmit torque is favorable with respect to cost and advantageous with respect to function, as already explained.

The design of the tangential leaf spring arrangement in the form of several tangential leaf springs acting between the housing and the intermediate plate and between the intermediate plate and the pressure plate, that is, the use of a multi-layer tangential leaf spring arrangement at both connection points, offers the advantage that, when the tangential leaf springs bend, friction occurs between the individual springs, which ensures advantageous damping. It is thus possible to suppress the fluttering or oscillation of the intermediate plate in particular. The intensity of the damping thus achieved can be adjusted by selecting the number of tangential leaf springs constituting a tangential leaf spring package. The larger the number of tangential leaf springs in a tangential leaf spring package, the greater the friction and the greater the damping. For maximum friction and thus maximum damping, the tangential leaf springs in a tangential leaf spring package should be arranged in such a way that they rest flat on each other with their flat surfaces rubbing against each other.

Because the torque is transmitted from the flywheel via the tangential leaf springs to the intermediate plate and the pressure plate, the housing itself and specifically the housing webs 18 themselves are not subject to the loads associated with the flow of torque. The dimensions of the housing webs 18 therefore can be based solely on the fact that they must support the counterforces which result from the actuation of the pressure plate by the diaphragm spring and that they must withstand the centrifugal forces which develop during operation.

The housing cover 14 can be centered advantageously on the housing webs 18 by an outer collar 13 (see FIG. 2), so that the screw joint 15 does not have to serve a centering function. Alternatively, the centering can be achieved by the use of tight-fit screws 15, which lowers manufacturing costs.

The housing cover 14 can be designed effectively with a ring-shaped stiffening crimp 11.

The finished clutch module can be balanced efficiently by the introduction of balancing bores in the flywheel 22. FIG. 1 indicates one of these balancing bores 23.

The clutch disk arrangement 1010 of the illustrated exemplary embodiment comprises, as previously mentioned, two friction lining units 1012 and 1014, which are arranged a certain distance apart in the direction of the axis of rotation A, around which the clutch disk arrangement 1010 rotates during operation of the clutch, and can shift position relative to each other in the direction of the axis of rotation A to allow the clutch-engaging and clutch-releasing operations.

The clutch disk arrangement 1010 comprises a hub element 1016, which has a set of teeth 1018 on its inner circumferential surface to produce a nonrotatable connection to a shaft, such as a transmission input shaft (not shown).

To form a torsional vibration damper, the hub element 1016 is designed with a central disk element 1090, which is permanently connected to the hub or forms, as in the present case, an integral part of it. On both axial sides of the central disk element 1090, there is a cover disk element 1092, 1094, which can rotate relative to the hub element 1016. Between the central disk element 1090 and the cover disk element 1092 on one side and between the central disk element 1090 and the cover disk element 1094 on the other side are friction/bearing rings 1108 and 1110 and a clamping spring 1112 to produce the desired frictional engagement. The two cover disk elements 1092, 1094 (FIG. 7*b*) are connected for rotation in common relative to the hub element 1016 in a manner known in and of itself, such as by means of connecting pins 1093 extending in the axial direction, which also hold the two cover disk elements at the desired axial distance away from each other. The cover plate elements and the central disk element have spring windows 1096, 1098, and 1100 (FIG. 1), in which damper springs 1102 are supported in the circumferential direction. These springs thus allow the cover disk elements 1092, 1094 to rotate relative to the hub element 1016 and its central disk element 1090. As can be seen in the figures, the damper springs can be formed by helical compression springs, or specifically also by two helical compression springs with turns of different diameters, one of which is telescoped into the other.

Each of the friction lining units 1012 and 1014 consists of a lining carrier disk and the friction linings, one of which is attached to each of the two axial sides of the lining carrier disk. The friction lining unit 1012 (FIG. 7*b*) located between the flywheel 22 and the intermediate plate 32 is attached permanently by its friction lining carrier disk to the cover disk element 1092; for example, it can be riveted to the cover disk element by means of rivets 1031. The other friction lining unit 1014 (FIG. 9*b*) is permanently attached by its lining carrier disk to a carrier element 1048, which could also be called a driver disk or driver ring. This carrier disk, too, can be riveted to the carrier element by means of rivets 1032. The driver ring

Figure 7:
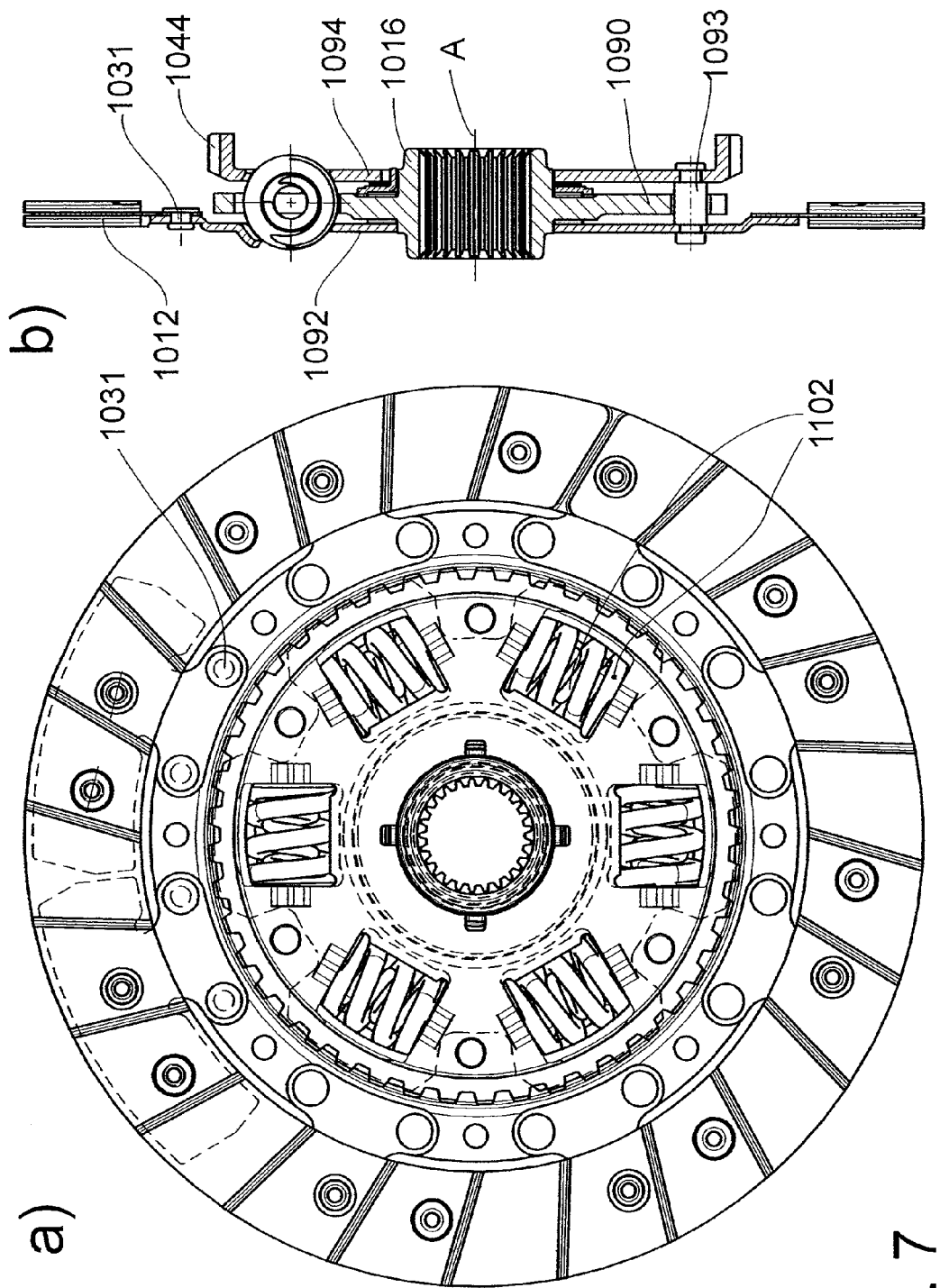
FIG. 7a shows an axial view of components of the clutch disk arrangement, namely, the clutch disk hub, the torsional vibration damper, and a friction lining disk attached to one of the cover plates of the torsional vibration damper.
FIG. 7b shows a longitudinal cross section through these components.
Figure 8:
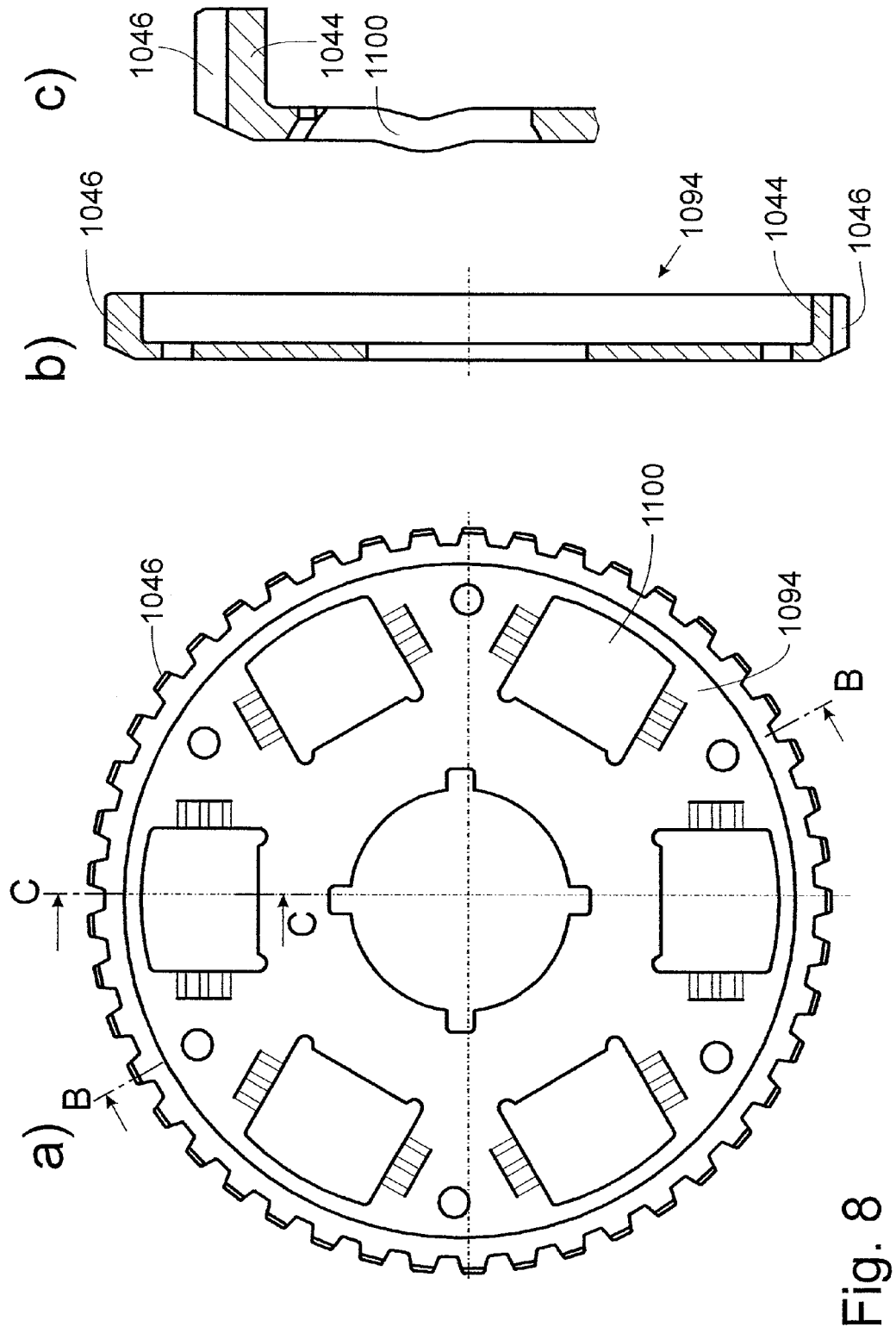
Figure 9:
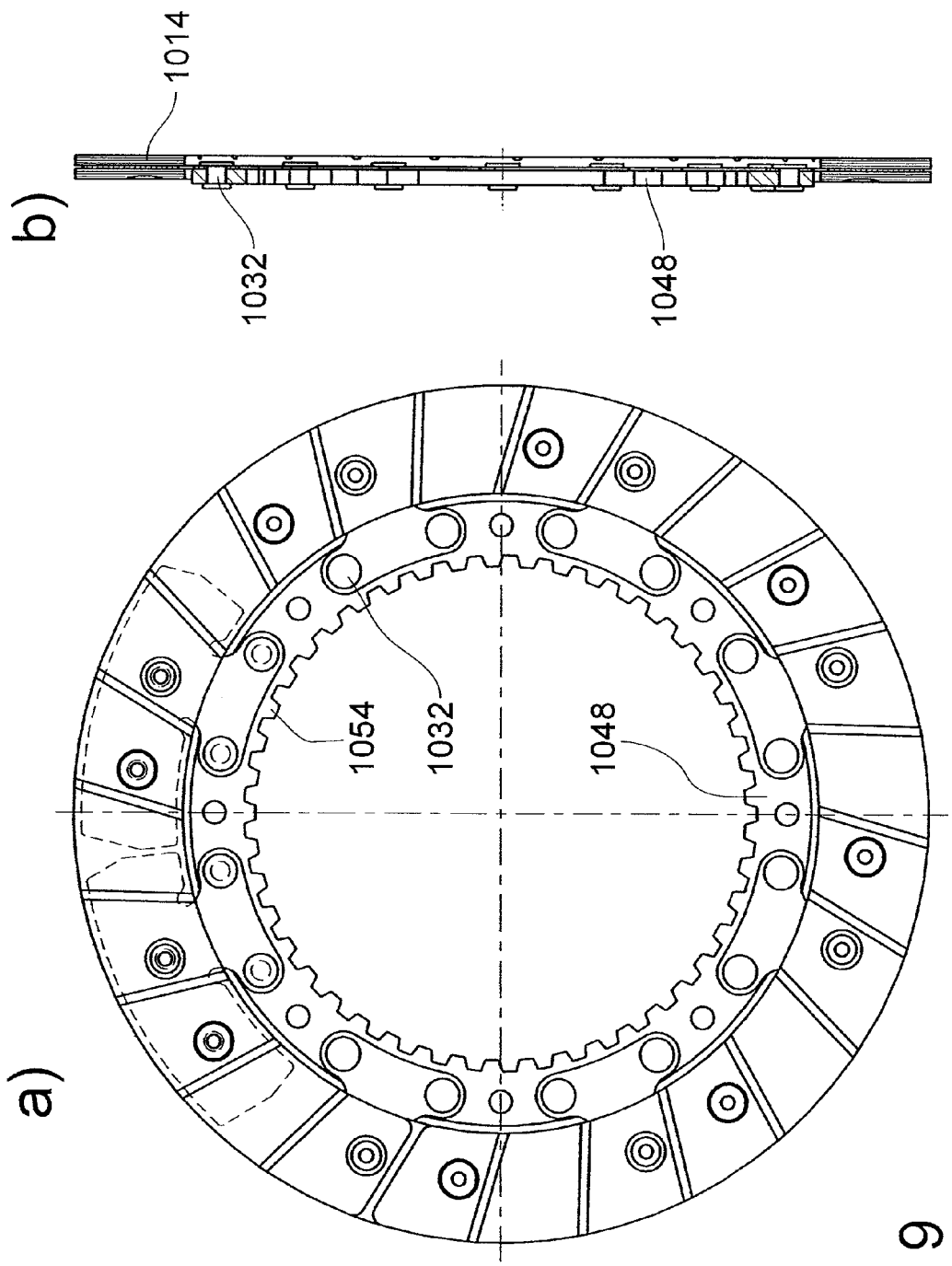
FIG. 9a shows an axial view of a driver disk along with the other friction lining disk attached to it.
FIG. 9b shows a longitudinal cross-sectional through these components.
Figure 10:
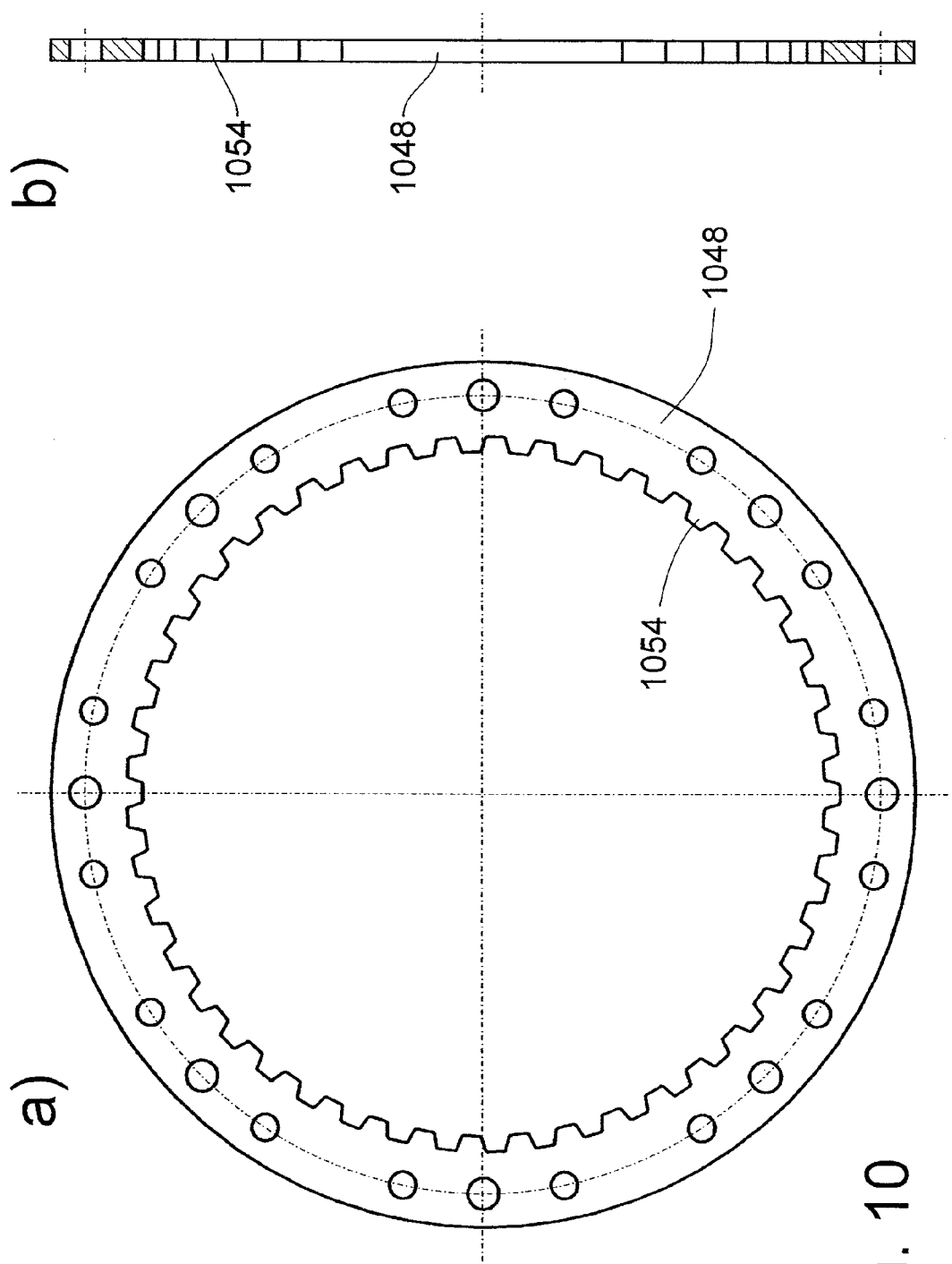
FIG. 10a shows an axial view of only the driver disk.
FIG. 10b shows a partial longitudinal cross section through this component.
Figure 11:
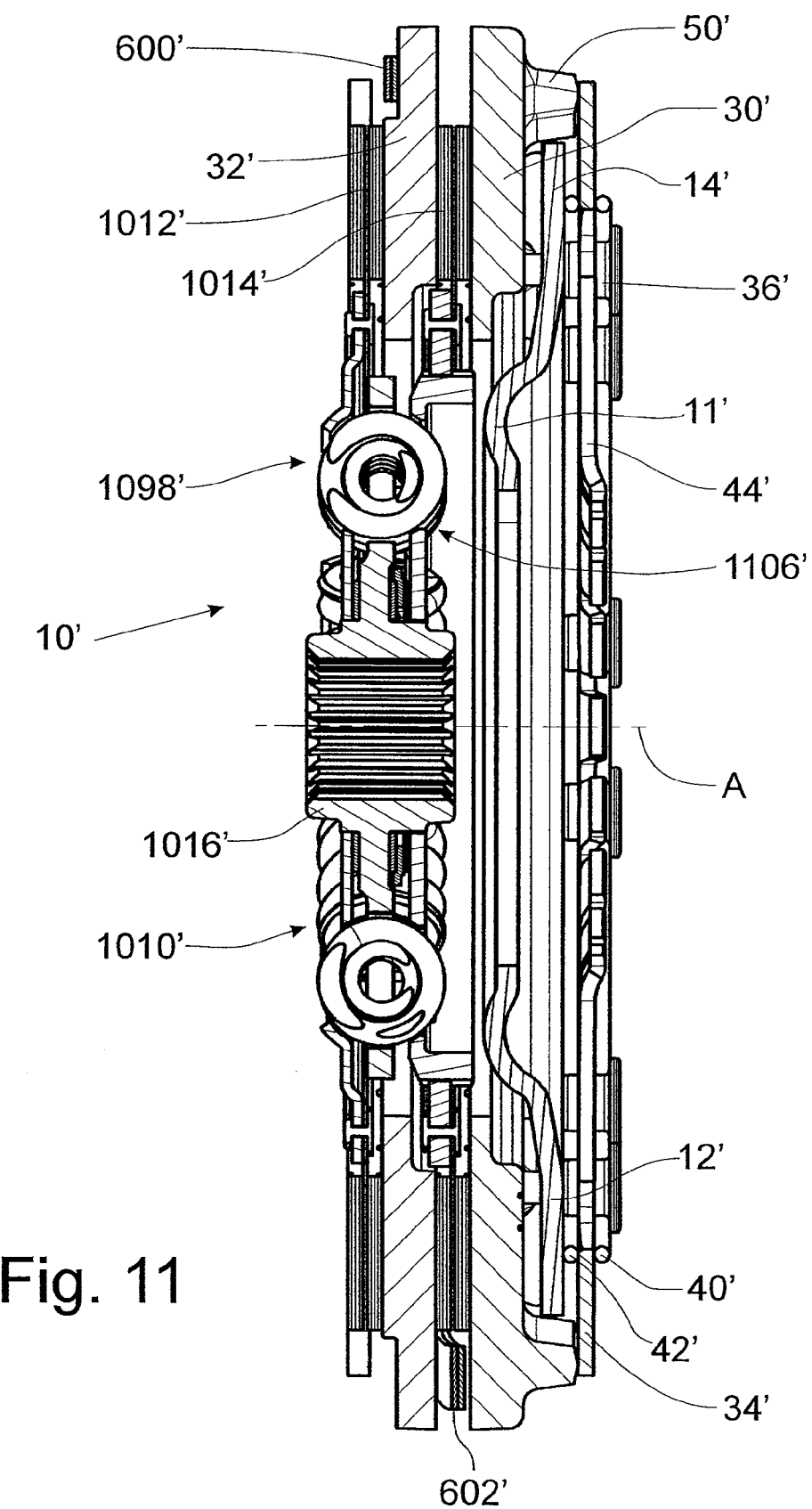
FIG. 11 shows a longitudinal cross section through an additional embodiment of an inventive dual-disk friction clutch.

1048 (FIG. 10) has a set of internal teeth 1054, by which it is seated on an axially extended set of external teeth 1046 on the cover disk element 1094 facing away from the flywheel, which element is cup-shaped in cross section with a circumferential wall 1044 (FIG. 1) extending in the circumferential direction. This circumferential wall carries the external teeth. So that the driver ring 1048 and thus the friction lining unit 1014 can slide axially on the set of external teeth 1046 of the cover disk element 1094 with the least possible friction, and so that this cover disk element is stable enough to support the axial orientation of the external teeth, it is made sufficiently thick in the axial direction and is, in the present case, thicker in the axial direction than the cover disk element 1092. A certain tipping or bending of the cover disk element 1092 is well tolerated. If it were possible for the cover disk element 1094 to pivot or bend, however, the internal teeth could become jammed in the outer teeth under certain conditions, or the driver ring 1048 could at least find it difficult to slide along the external teeth of the cover disk element 1094. The design of the cover disk element 1094 with external teeth 1044 and of the driver ring 1048 with internal teeth 1054 can be seen in FIGS. 1 and 2 and especially in FIGS. 8 and 9. FIG. 7 also shows the friction lining carrier element which is attached to the cover disk element 1092 and which forms the lining carrier ring of the friction lining unit 1012; also shown is the riveting of the carrier element to the radially outer area of the cover disk element 1092. FIG. 9 shows the friction lining carrier element which is attached to the driver ring 1048 and which forms the lining carrier ring of the friction lining unit 1014; also shown is the riveting of the carrier element to the radially outer area of the driver ring 1048.

As can be derived from the axial cross sections of the clutch disk arrangement and of the clutch, the cover disk element 1092 closer to the flywheel is only slightly cupped and to this extent is especially easy to manufacture. As usual, the cover disk element is designed as a cover plate. The other cover disk element, which is preferably shaped by a metal-forming process such as deep-drawing, has a bottom wall area, through which the windows 1100 extend in the radial direction, and the circumferential wall area 1044, which carries the external teeth 1046. This circumferential wall area 1044 projects away from the torsional vibration damper toward the diaphragm spring and is therefore cupped in the direction facing away from the torsional vibration damper. The clutch hub 1016 with the torsional vibration damper can therefore be located comparatively close to the flywheel 22, i.e., to the engine, so that more space is available for the diaphragm spring tongues and their deflection toward the engine and for the corresponding movement of the release ring 45, which could also be called a release cup. The space available radially inside the friction linings is therefore utilized very effectively. It should be noted that it would also be possible to provide the cover disk element 1094 facing away from the flywheel with a set of internal teeth and accordingly to provide the carrier element 1048, which would then be designed with an axially projecting ring-shaped flange or the like, with a set of external teeth.

Additional details of the exemplary embodiment pertaining to the clutch disk arrangement and to the overall dual-disk clutch can be derived by the expert from the figures and do not need to be explained here in any greater detail.

FIGS. 11-16 show another exemplary embodiment of a multi-disk clutch as a whole, with a plate arrangement consisting of an intermediate plate and a pressure plate; with the overall pressure plate assembly, which consists of the plate arrangement and the clutch housing, the clutch housing being designed to be connected to a flywheel, which serves as an abutment (not shown); and with a dual-disk clutch disk arrangement, which is essentially the same as the clutch disk arrangement according to FIGS. 7-10.

Only the differences between the design according to FIGS. 11-16 and that according to FIGS. 1-6 will be explained in the following, where the same reference symbols are used for analogous or identical components, except that here an apostrophe (10', 12', etc.) is added to the symbol. Insofar as components and elements of the clutch are not discussed in the following or not provided with a reference symbol in FIGS. 11-15, reference is made explicitly to the preceding explanation of the exemplary embodiment according to FIGS. 1-6 and of the clutch disk arrangement according to FIGS. 7-10. The longitudinal cross section according to FIG. 11 corresponds to the cross section along line XI-XI in FIG. 13, and the longitudinal cross section according to FIG. 12 corresponds to a cross section along line XII-XII in FIG. 13.

Figure 12:
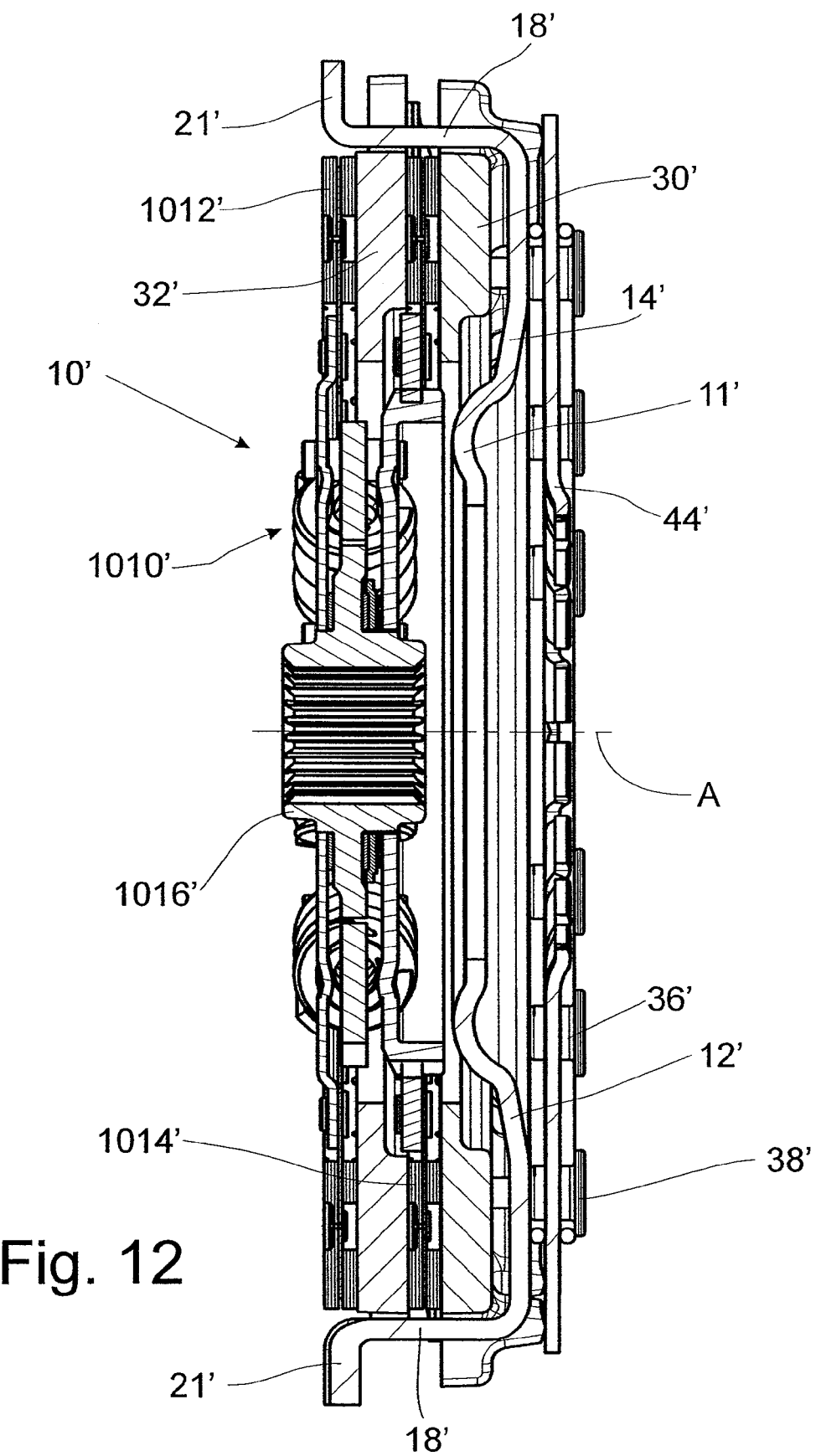
FIG. 12 shows another longitudinal cross-section through the dual-disk friction clutch according to FIG. 11 along a cross-sectional line offset by a certain angle from that of FIG. 11.
Figure 13:
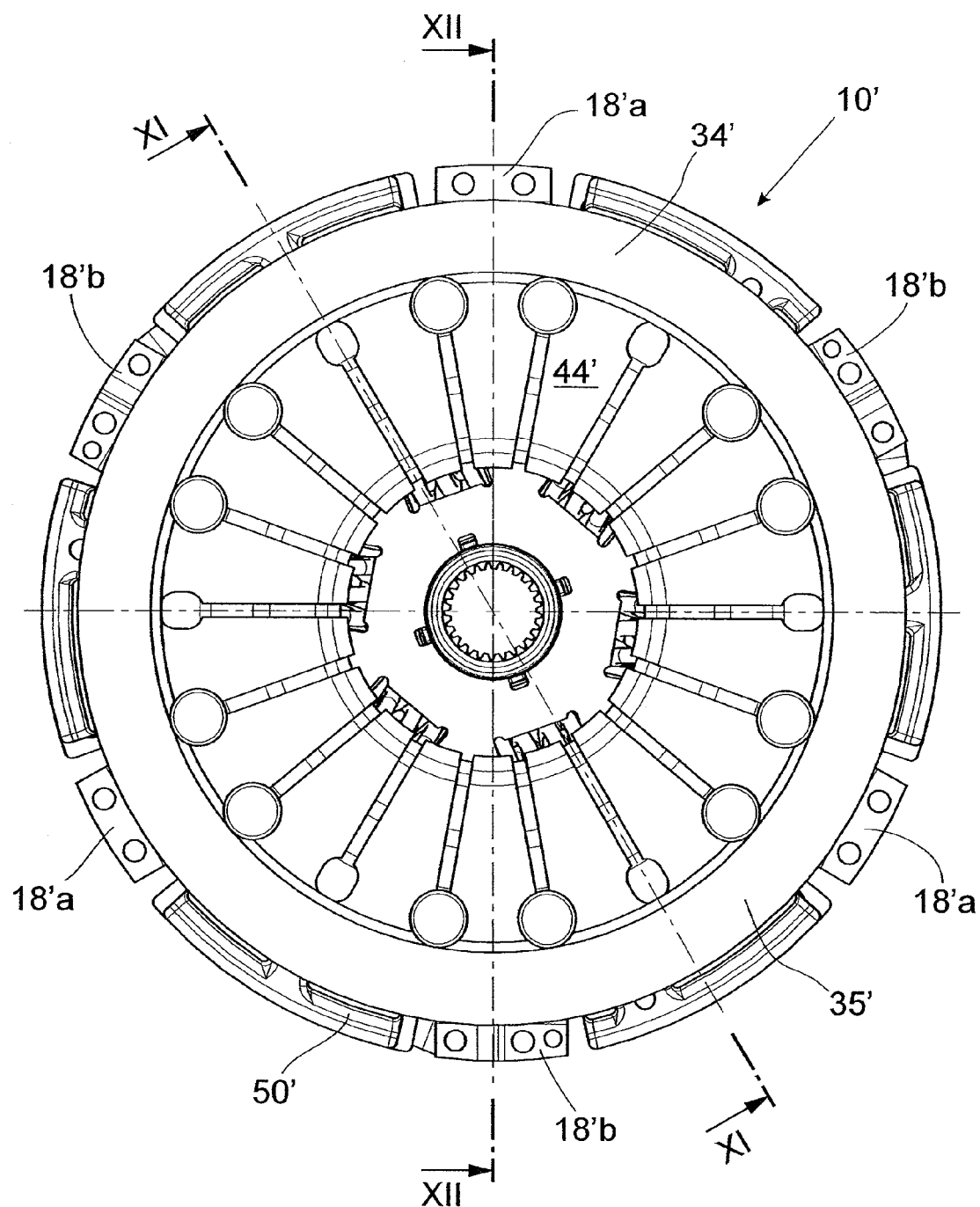
FIG. 13 shows an axial view of the friction clutch of FIGS. 11 and 12.
Figure 14:
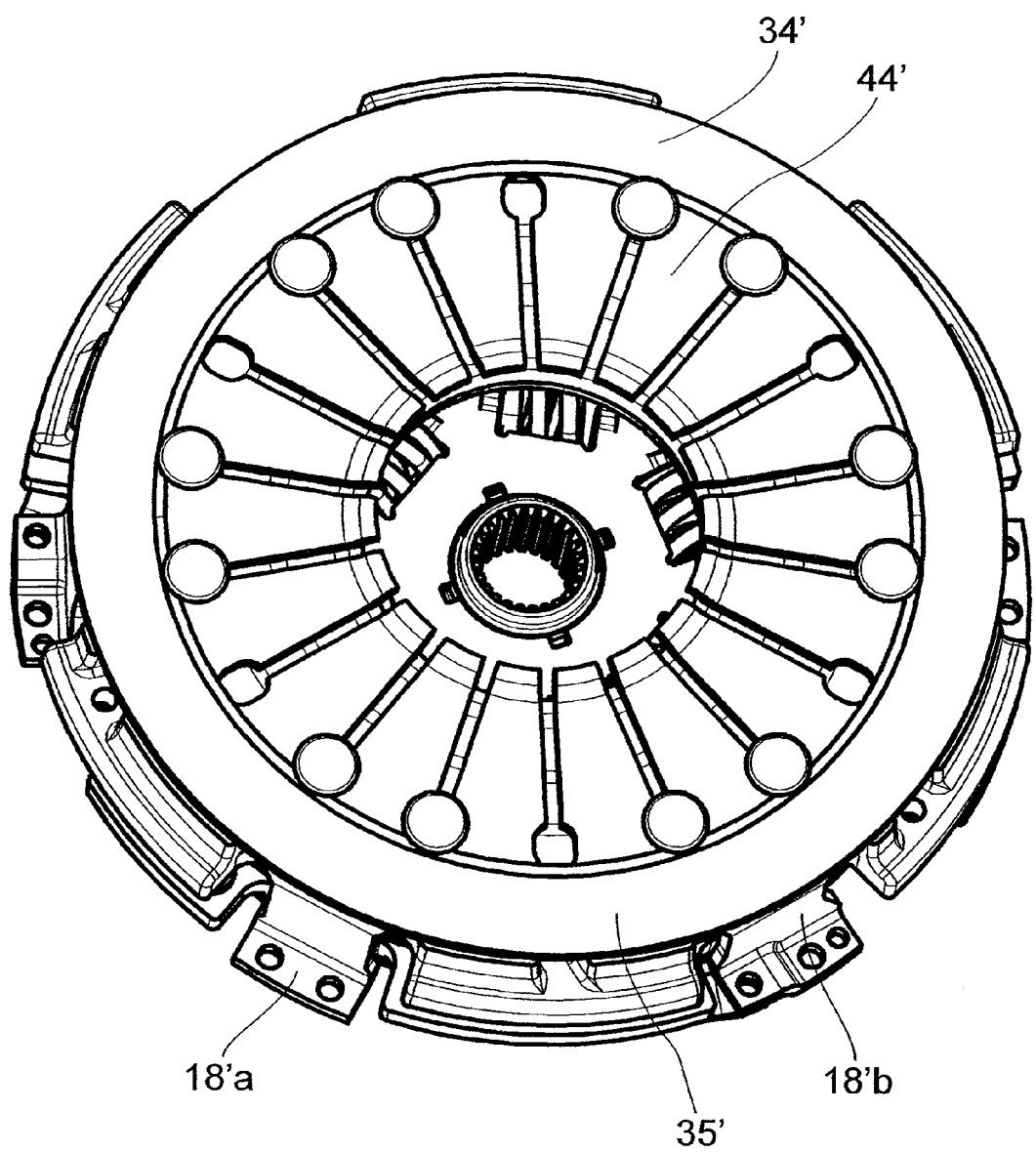
FIG. 14 shows another view of the dual-disk clutch of FIGS. 11-13.
Figure 15:
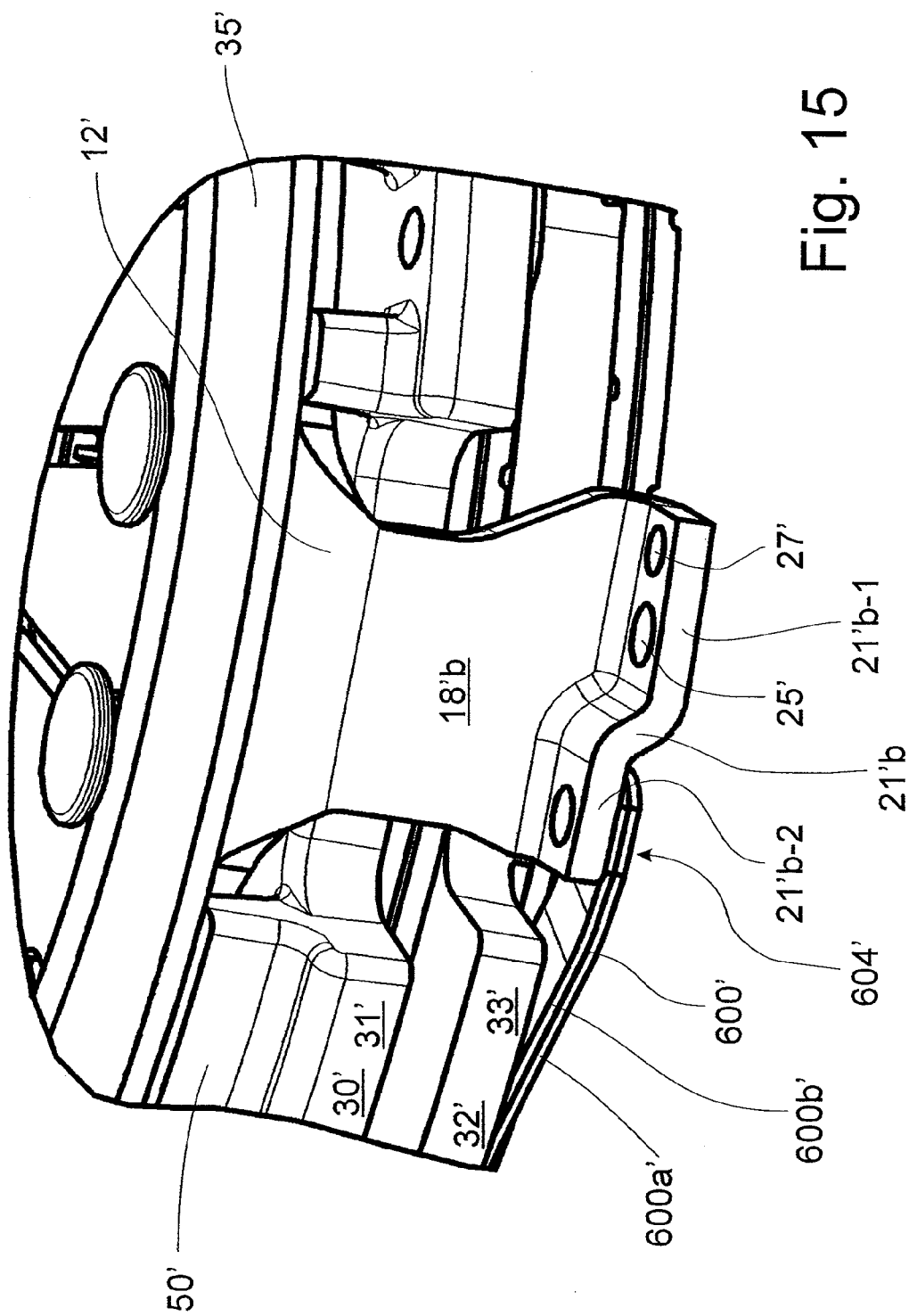
FIG. 15 shows an enlarged view of a circumferential area of the dual-disk clutch of FIGS. 11-14.
Figure 16:
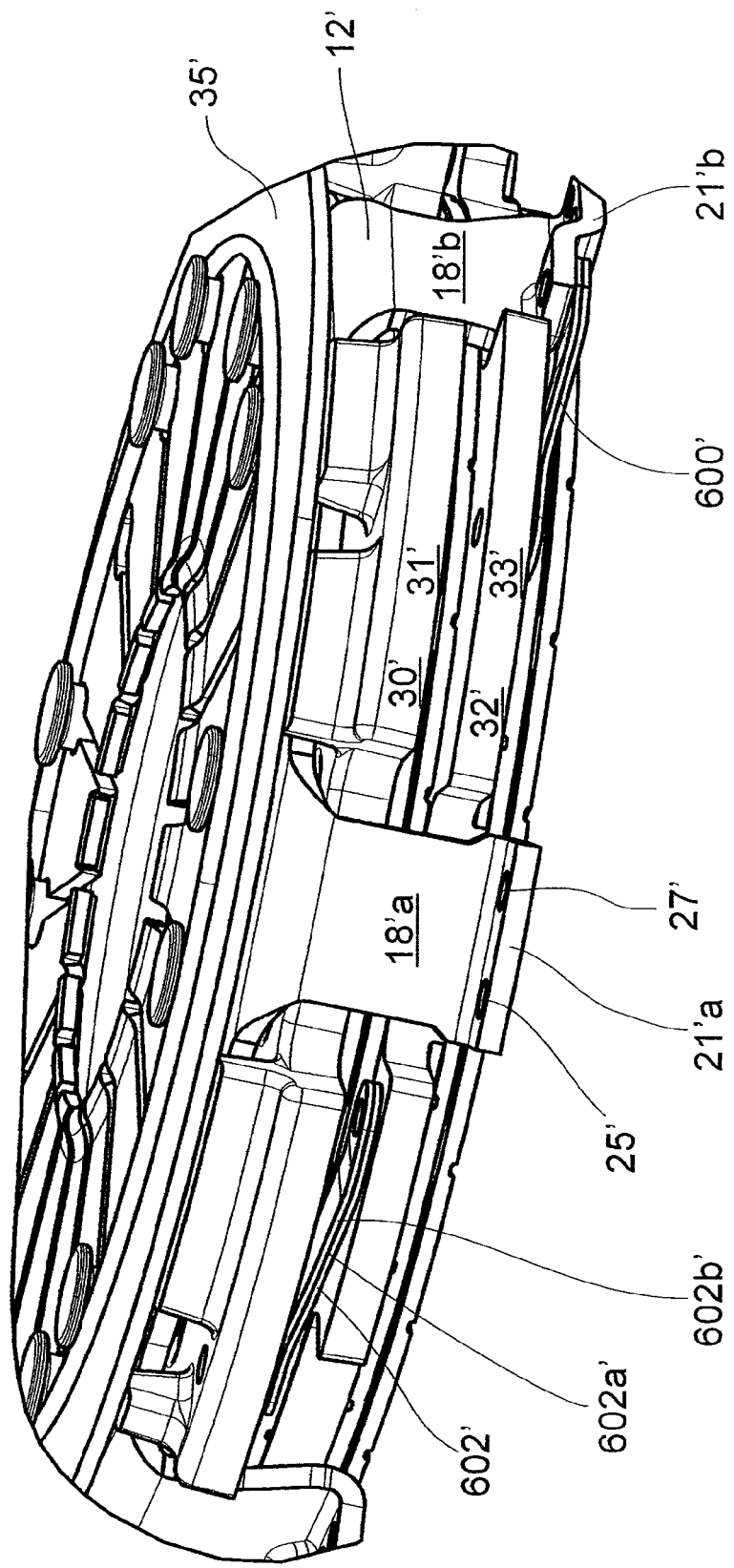
FIG. 16 shows a less magnified view of a circumferential area of the dual-disk clutch of FIGS. 11-15.

As can be seen especially clearly in FIGS. 12, 15, and 16, the housing in the case of the exemplary embodiment of FIGS. 11-16 is formed on the basis of a wall 14', which corresponds functionally to the cover 14 of the first exemplary embodiment, namely, the wall which carries the diaphragm spring 34' and which could appropriately be called the "bottom part" of the housing. The wall 14' merges continuously into axially oriented support or bracing sections 18', which are designed with integral flange-like housing feet 21', by which the housing can be connected to an abutment arrangement, which, in the present exemplary embodiment, is a flywheel. For this purpose, the housing feet 21' are designed with threaded bores 25' (FIG. 16) and locating pin bores 27'. The housing wall 14' can be produced effectively along with its tab-like support sections 18' and the flange-like housing feet 21' by the forming of an appropriate metal disk part, especially a sheet-metal part, by a process such as deep-drawing.

Two different types of support sections 18' are provided, namely, the support sections 18'a, which, like the support sections 18 of the first exemplary embodiment, serve primarily to support indirectly the diaphragm spring against the abutment arrangement, specifically the flywheel, and are designed with housing feet 21a', which serve only to connect the housing to the abutment arrangement, and support sections 18'b, which are designed with a specially designed housing foot 21'b (FIG. 15). This foot has a first section 21'b-1 with a threaded bore 25' and a locating pin bore 27' and a section 21'b-2, axially offset from the first in the direction toward the diaphragm spring, to which the tangential leaf spring pair 600' is riveted by means of a rivet 604'. It should be noted that, in the case of the exemplary embodiment shown here, the tangential leaf spring pair 600' in question is riveted to the housing foot 21'b on the side of the foot facing away from the intermediate plate 32', and therefore on the axial surface of the housing foot section 21'b-2 facing the flywheel. This means that more space is available for the tangential leaf springs in the axial direction and/or that the dual clutch as a whole can be designed with especially compact axial dimensions.

As can be derived from FIG. 13, three support sections 18'b are provided, the housing feet 21'b of which are designed to hold the intermediate plate by means of the tangential leaf springs 600'. Three support sections 18'a are also provided, which are located between the support sections 18'b. The housing feet 21'a of these support sections serve only to connect the clutch housing 12' to the flywheel or the like.

The connection of the tangential leaf springs to a housing foot which serves by means of at least one locating pin bore to center the clutch housing on the flywheel (or on the output side of the dual-mass flywheel or some other component) is especially advantageous in the sense that a high degree of positioning accuracy is obtained for the diaphragm springs and thus for the intermediate plate held by them and indirectly also for the pressure plate, which is held against the intermediate plate by tangential leaf springs 602'. Good concentric running behavior is therefore achieved; i.e., imbalance can be avoided. In the exemplary embodiment illustrated here, furthermore, it is advantageous that the threaded bore 25', 27' by which the clutch housing 12' is screwed to a flywheel or the like is very close to the point at which the housing is riveted to the tangential leaf springs 600', as a result of which any deformation of the component which might occur under load is minimized, because the forces in question proceeding from the housing foot are absorbed directly by the abutment arrangement (flywheel or the like).

As FIG. 16 shows, the tangential leaf springs 600' and the tangential leaf springs 602' are located in different open segments between the support sections 18'$a$ and 18'$b$. So that the forces do not have to flow over a long distance via the intermediate plate 32', the tangential leaf springs 600' and 602' could, in contrast to the diagram, be located jointly in the same open segment, as is the case in the exemplary embodiment of FIGS. 1-6.

It should be pointed out that, in a departure from the embodiment shown, the tangential leaf springs holding the pressure plate could be attached, especially riveted, to different points of the clutch housing; for example, they could be attached to the housing wall 14', preferably to the diaphragm spring side (transmission side) of the housing wall 14'. In particular, however, the basic idea is to attach these tangential leaf springs to a fastening surface of the associated support section adjacent to the pressure plate, preferably to the side of the fastening surface which faces away from the pressure plate. The result is a corresponding increase in the amount of space available in the axial direction, as also achieved in the exemplary embodiment according to FIGS. 11-16.

The embodiments of FIGS. 11-16 are characterized not only by the ease with which the housing 12' in particular can be manufactured but also by the ease with which the various components can be assembled. The clutch disks with the friction lining units 1012' and 1014' are preferably laid together with the pressure plate 30' and the intermediate plate 32', respectively, in the correct axial order. It is preferable to equip one of the two plates beforehand with the tangential leaf springs 602' and to equip the intermediate plate beforehand with the tangential leaf springs 600'. Then the tangential leaf springs 602' are riveted to the other plate. The component group thus obtained, i.e., the group consisting of the pressure plate 30', the clutch disk arrangement, and the intermediate plate 32', can then simply be placed in the housing, and the tangential leaf springs 600' are then riveted to the housing feet 21'$b$.

The housing feet of the unit thus obtained can then be simply screwed to the assigned abutment arrangement, such as a flywheel. If desired, it can be screwed to an abutment arrangement which has already been mounted in a power train.

Figure 17:
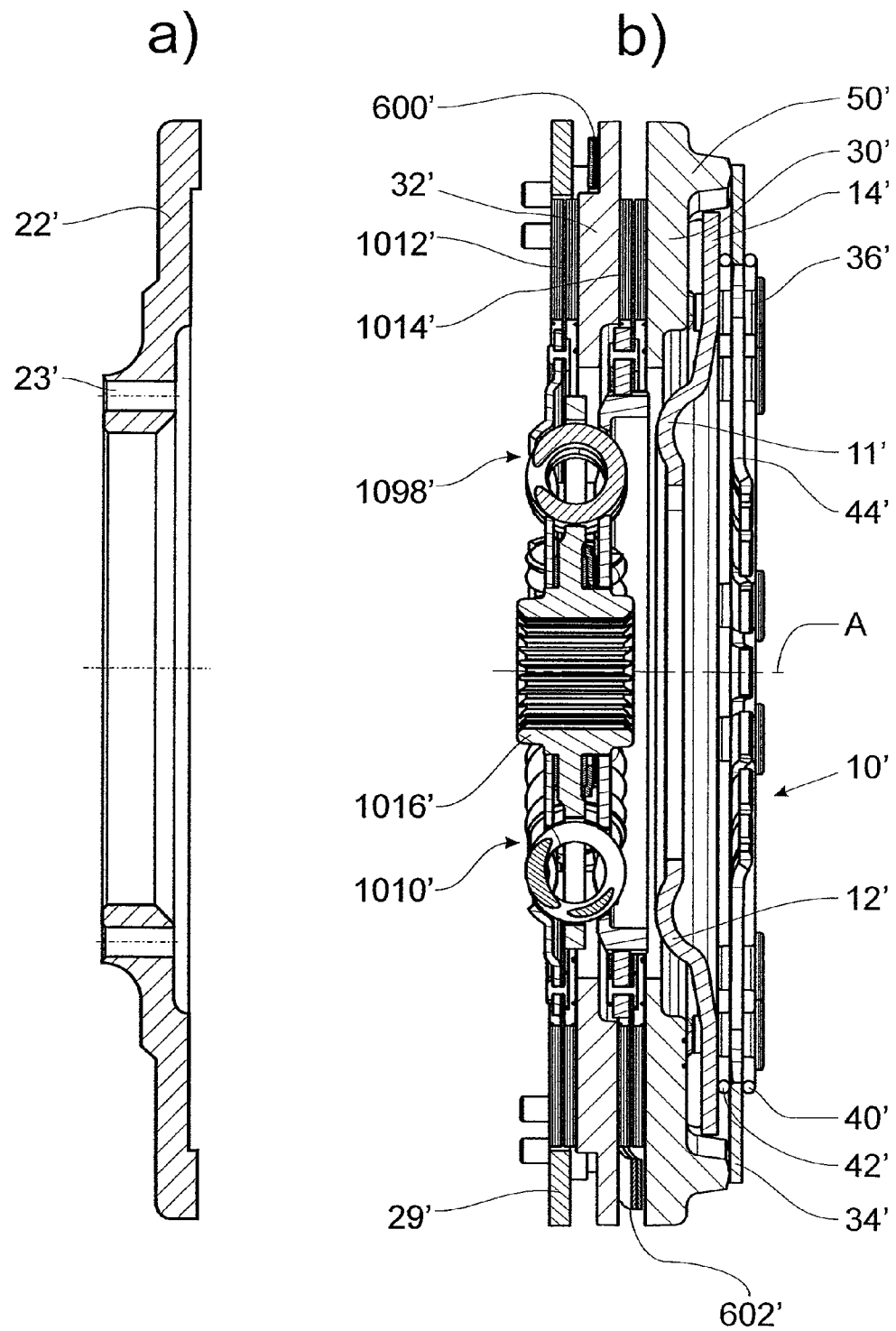

FIG. 17 shows a design variant of dual-disk clutch which deviates slightly from the embodiment of FIGS. 11-16. The clutch is shown here in combination with its assigned flywheel 22'. For the explanation of the dual-disk clutch, the same reference symbols as those used for the embodiment of FIGS. 11-16 are applied to analogous or identical parts, these reference symbols being provided with an apostrophe (10', 12', etc.). If a component or element of the clutch is not mentioned in the following or not provided with a reference symbol in FIGS. 17 and 18, reference is made explicitly to the preceding explanation of the exemplary embodiment of FIGS. 1-6, of the clutch disk arrangement of FIGS. 7-10, and of the exemplary embodiment of FIGS. 11-16.

Figure 18:
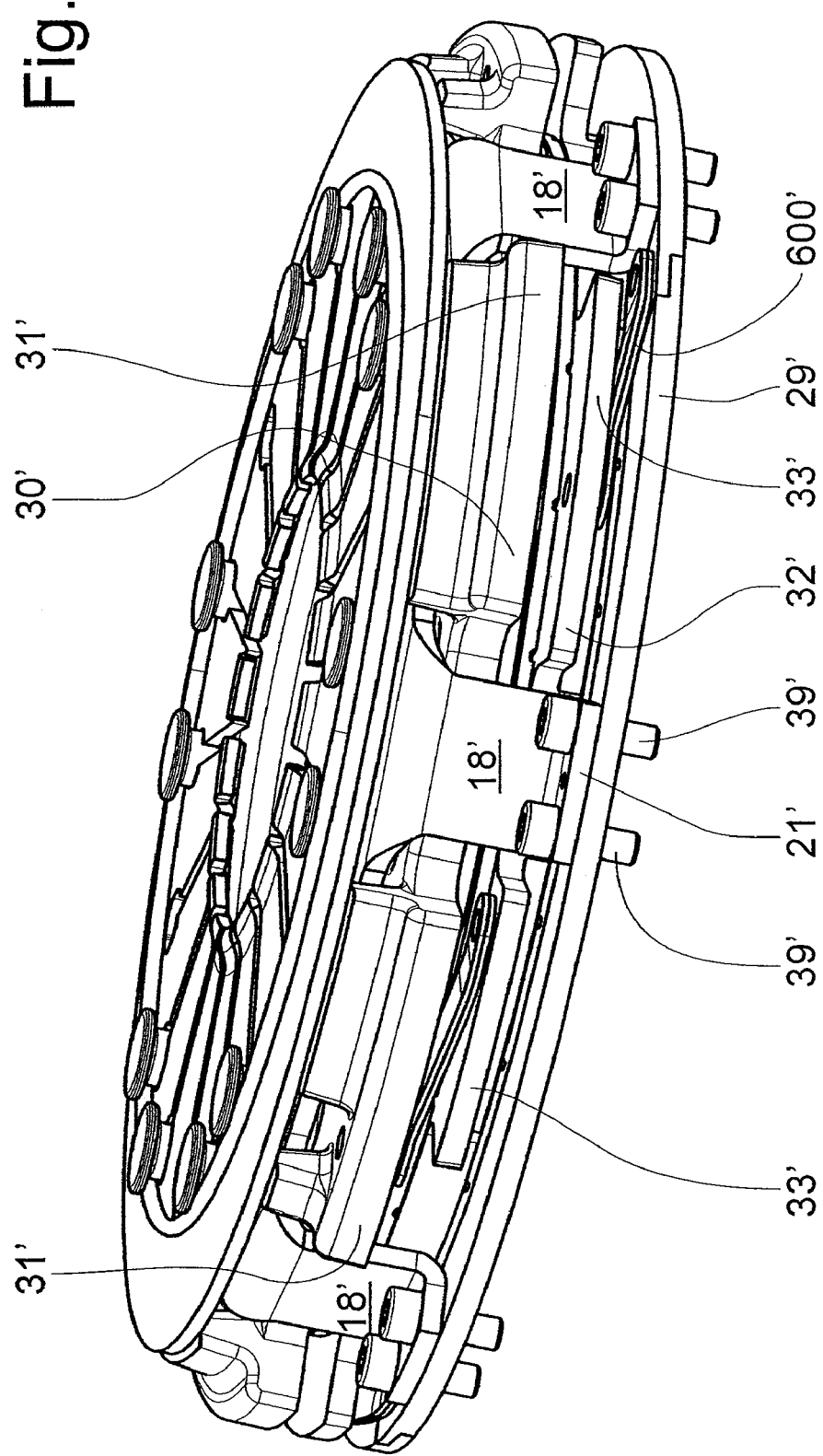
FIG. 18 shows an enlarged view of a circumferential area of the dual-disk clutch of FIG. 17b.

As in the embodiment of FIGS. 11-16 to which reference is made, the housing of the design variant according to FIGS. 17 and 18 is formed on the basis of a wall 14', which carries the diaphragm spring 34'. This wall merges continuously into axially oriented support or bracing sections 18', which carry as integral parts the flange-like housing feet 21', by means of which the housing can be connected to an abutment arrangement, which can be, as in the present exemplary embodiment, the flywheel 22'. An intermediate ring 29' is mounted on the support sections 18' or, more accurately, on the housing feet 21'; the releasing springs 600' are permanently riveted to this ring. The intermediate ring 29' is riveted to at least some of the housing feet 21'; for example, it can be riveted to every second housing foot 21' in the circumferential direction, so that the housing, with the plates inside it, is held together with the intermediate ring 29', and a unit is formed. In addition, the screw bolts 39', which are used to fasten the housing to the abutment arrangement, pass through fastening openings in the housing feet 21' and the complementary fastening openings in the intermediate ring 29', so that the intermediate ring 29', located axially between the housing feet 21' and the abutment arrangement, is also, in the fully assembled state of the clutch, permanently connected by the fastening bolts 39' to the housing on one side and to the abutment arrangement, here the flywheel 22', on the other side.

Both embodiments, i.e., the embodiment according to FIGS. 11-16 and the embodiment according to FIGS. 17 and 18, offer the advantage over the embodiment of FIGS. 1-6 that the entire clutch—except for the flywheel serving as the abutment—can be made available as a preassembled unit, which is screwed by way of the housing feet to the flywheel. In the design variant of FIGS. 17 and 18, the ring 29' facing the flywheel holds the unit together and stiffens the support sections or housing feet especially with respect to the centrifugal forces which are in play during operation.

In both design variants, it is both possible and advantageous for the unit to be permanently screwed from the release mechanism side to the flywheel or dual-mass flywheel. It is therefore possible to avoid the disadvantageous effort involved in screwing the unit in place from the engine side, through the flywheel or dual-mass flywheel.

Another advantage is that a clutch of the type in question can in principle be mounted on any flywheel or dual-mass flywheel of suitable dimensions. It is therefore not necessary to adapt the clutch in any special way to a specific flywheel or to include the flywheel in the work of designing the clutch.

The clutch is especially suitable for flywheels designed for especially high torques, especially two-row, dual-mass flywheels, because there is no need to pass screws through them.

An advantage of the intermediate ring 29' is that the torque is transmitted from the flywheel to the ring and from the ring directly via the tangential leaf springs to the intermediate plate, from which the remaining torque is conducted via the other tangential leaf springs to the pressure plate. Neither the housing nor the housing feet transmit any torque. They are therefore essentially free of any load and can thus be made thinner than would otherwise be possible. The loads associated with torque therefore do not subject the housing to load, and in particular they do not cause the housing to bend. The support sections and the housing feet can therefore be made very narrow in the circumferential direction and otherwise with thin walls. This results in an increase in the amount of space available for the intermediate plate and the pressure plate and also for the connection of the plates to the housing by the tangential leaf springs. Assembly is also comparatively simple.

The advantages of the design variant with the intermediate ring 29' discussed above apply in similar fashion to the design variant of FIGS. 11-16, because here only the housing feet 21'*b* are included in the flow of torque between the flywheel and the intermediate plate, whereas the areas of the support sections 18'*b* extending in the axial direction are not included in this flow. It is therefore sufficient to design only the housing feet 21'*b* with appropriate strength. The advantage of this design variant over that of FIGS. 14 and 18 is that the need for a separate component, namely, the intermediate ring 29', is eliminated, which decreases cost. In spite of the elimination of the intermediate ring, the clutch, after final assembly according to FIG. 16, is still easy to handle as a unit, and the individual components are held together securely. The flywheel stiffens the support sections 18' and thus supports them specifically against the centrifugal forces which occur during operation.

In comparison with the embodiment of FIGS. 1-6, the design variants discussed above offer the great advantage that a simple flywheel without web-like support sections is sufficient, so that the flywheel can be manufactured at lower cost and the volume of metal which must be machined away is considerably smaller. The support sections and the housing feet along with the wall which carries them as integral parts can be shaped very easily out of sheet metal, where, in the case of the design variant with the intermediate ring, only two straight bending lines are sufficient. For example, the support section can be bent along one line toward the flat bottom or cover area, and then bent over again to form the flange-like housing foot. In contrast, in the case of the design variant without the intermediate ring, the housing feet 21'*b* are bent in a somewhat more complicated fashion. It has been found, however, that the appropriate shaping of the housing feet 21'*b* does not present any problem.

Another advantage of the design variants discussed above over the embodiment of FIGS. 1-6 is that the mass moment of inertia of the clutch can be smaller, because the there is no need for the flywheel to have massive support webs.

Various modifications of the design variants explained above are possible. For example, with respect to the embodiment of FIGS. 17 and 18, the housing feet 21' of some of the support sections 18'—let it be assumed that six are present—can have at least one bore for screwing to the flywheel and at least one riveted connection to the intermediate ring 29', whereas the housing feet of the other support sections are provided with at least one, preferably with at least two bores for screwing to the flywheel through the intermediate ring. These support sections are preferably arranged alternately in the circumferential direction, so that, if there are six support sections, three with feet riveted to the intermediate ring alternate with three with housing feet not riveted to the intermediate ring. It is also possible, however, for all of the housing feet to be of the same design and for each one to have at least one, preferably two bores for screwing to the flywheel, at least one riveted connection to the intermediate ring, and possibly also one bore of smaller diameter to engage with an associated locating pin on the flywheel for centering the clutch on the flywheel.

The intermediate ring 29' is preferably designed as a single piece, as shown in FIG. 18. In contrast, FIG. 19 shows the possibility of forming the intermediate ring 29' out of separate, ring-shaped segments (ring elements 29'*a* and 29'*b* are shown), which are connected to each other by the rivets which hold the tangential leaf springs 600'. If, for example, six support sections 18' are provided and the tangential leaf springs 600' between the intermediate ring 29' and the intermediate plate 32' are provided only in every second open area between the support sections 18', the intermediate ring 29' can, for example, be formed by three ring segments, each extending over two open areas as in the case of segments 29'*a* and 29'*b*, which are connected to form the intermediate ring 29' by the rivets used to hold the tangential leaf springs 600'.

FIG. 20 shows a different possibility, according to which there is no continuous or multi-part ring at all. Only arc-shaped intermediate webs 29' are provided, each of which extends between two housing feet 21' and carries the riveted connections for the tangential leaf springs 600' for the intermediate plate 32'. A gap between two intermediate webs 29' is present in every second open area between the support sections 18', as a result of which material and thus weight or inertial mass are saved. In comparison with the design possibility with a continuous, one-piece intermediate ring, it is cheaper to manufacture ring segments which form a multi-part intermediate ring or to manufacture arc-shaped intermediate webs which do not form or a ring or only a ring with gaps.

The important aspects of the design variants of FIGS. 11-20 are:

A preassembled unit can be provided, which does not have a flywheel or a dual-mass flywheel. The unit is assembled in such a way, possibly after attachment of the intermediate ring, that it can be transported without loss of parts. The only part which might be left separate is a clutch disk of the clutch disk arrangement, which could be laid loosely in place, for example. The sequence of assembly steps at the automotive assembly plant can be similar to that conventionally used for standard single-disk clutches. First the flywheel or dual-mass flywheel is mounted; and then a clutch disk and the preassembled unit are mounted, especially screwed, to the flywheel from the clutch-release mechanism/transmission side.

Significant cost savings are thus obtained, especially with respect to the fabrication of the secondary flywheel of a dual-mass flywheel and the advantage of being able to mount the unit from the clutch-release mechanism side. The pitch diameter possible for the effective friction surfaces can also be made larger, especially because the support sections, which are separate from the flywheel and which are preferably formed from sheet metal, occupy only a small amount of radial space.

In the exemplary embodiment according to FIGS. 1-5, a type of connection of the tangential leaf springs to the housing of the dual-disk clutch is realized which, when tangential leaf springs of the same geometry are used between the flywheel and the intermediate plate and also between the intermediate plate and the pressure plate, can guarantee that the stroke between the pressure plate or the intermediate plate will be equal to the stroke between the intermediate plate and the flywheel. The reason for this is that, in the exemplary embodiment of FIGS. 1-5, the terminal sections of the tangential leaf springs 600 are attached to an axial side of the flywheel and to an axial side of the intermediate plate, whereas the terminal sections of the tangential leaf springs 602 are attached to an axial side of the pressure plate and to an axial side of the intermediate plate, so that each terminal section rests on its own component in such a way that it faces the other component connected via the tangential leaf spring in question, which means in turn that the all of the tangential leaf springs are supported in the same way by flat surfaces at both ends.

In the other exemplary embodiments (see especially FIGS. 11-16, but also FIGS. 18-20), however, the housing-side connection of the tangential leaf springs 600' is shifted axially toward the intermediate plate and away from the axial side of the flywheel facing the intermediate plate; the tangential leaf springs 600', which connect the intermediate plate to the housing, therefore do not rest against a side of the flywheel or of the secondary flywheel. The other ends of these tangential leaf springs 600', however, rest on the intermediate plate, and the ends of the tangential leaf springs which act between the intermediate plate and the pressure plate also rest on their associated plates. This has the result that it can be very difficult to guarantee that the stroke between the pressure plate and the intermediate plate will be equal to the stroke between the intermediate plate and the flywheel. This goal can be approached by using different geometries, i.e., one for the tangential leaf springs between the pressure plate and the intermediate plate and another for the tangential leaf springs between the intermediate plate and the housing. In concrete terms, this means that the tangential leaf springs between the housing and the intermediate plate would be shorter or axially flatter than those between the intermediate plate and the pressure plate. Without a great deal of effort, it is therefore very difficult to create the same relationships for the two sets of tangential leaf springs, that is, to provide the same force-distance characteristics for the tangential leaf springs between the housing and the intermediate plate and for the tangential leaf spring between the intermediate plate and the pressure plate.

As already suggested, the reason for this in the case of the embodiment according to FIGS. 11-16 is in particular that the ends of the tangential leaf springs between the pressure plate and the intermediate plate rest on the plates, whereas the housing-side ends of the tangential leaf springs between the housing and the intermediate plate do not rest on the flywheel (or possibly the secondary flywheel). The figures show that each of the tangential leaf springs has two inflection points, each of which forms the boundary, so to speak, of a housing-side or plate-side terminal riveting section. The free bending length of the tangential leaf spring corresponds essentially to the distance between the two inflection points of the tangential leaf spring. In the exemplary embodiment according to FIGS. 11-16, the tangential leaf springs 600' do not rest on the axial side of the flywheel facing the intermediate plate but are instead permanently riveted to the side of the section 21'*b*-2 of the housing foot facing away from the intermediate plate. As a result, the terminal section of the tangential leaf spring 600' on the housing-side is not supported all the way to the inflection point, which means that the bending length of the tangential leaf spring extends all the way to the head of the rivet.

Because the bending length of the tangential leaf springs between the intermediate plate and the pressure plate is different from that of the tangential leaf springs between the intermediate plate and housing, the tangential leaf spring packages have different stiffnesses and different force-distance characteristics. When the clutch is actuated, therefore, the intermediate plate will not be centered precisely between the pressure plate and the flywheel. In particular, it may prove necessary for the pressure plate to travel an additional distance to compensate for this, which is undesirable.

Figure 21:
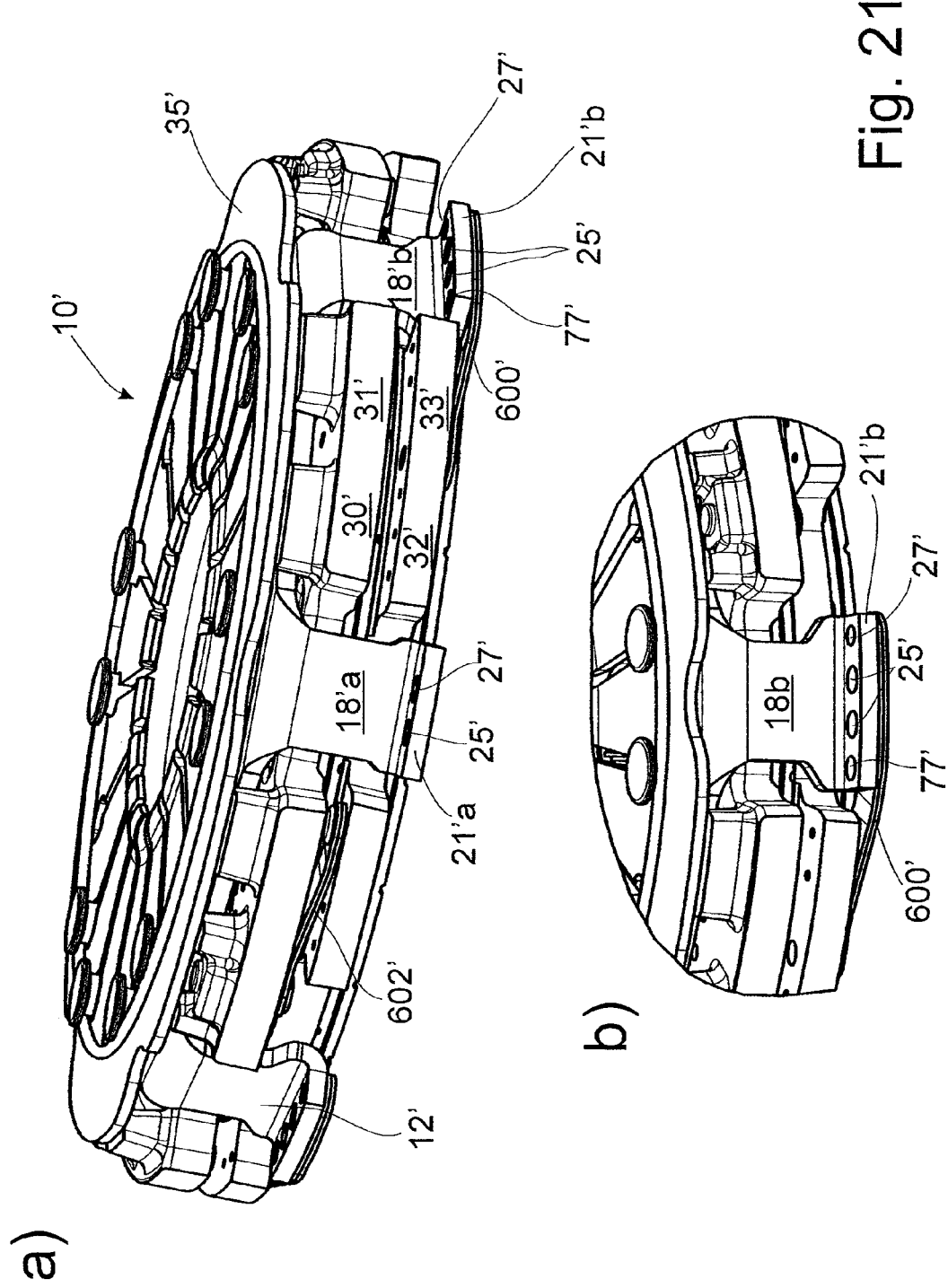
FIG. 21a shows a view of a circumferential area of an additional exemplary embodiment of a dual-disk clutch.
FIG. 21b shows an enlarged view of the circumferential area of the dual-disk clutch.
Figure 22:
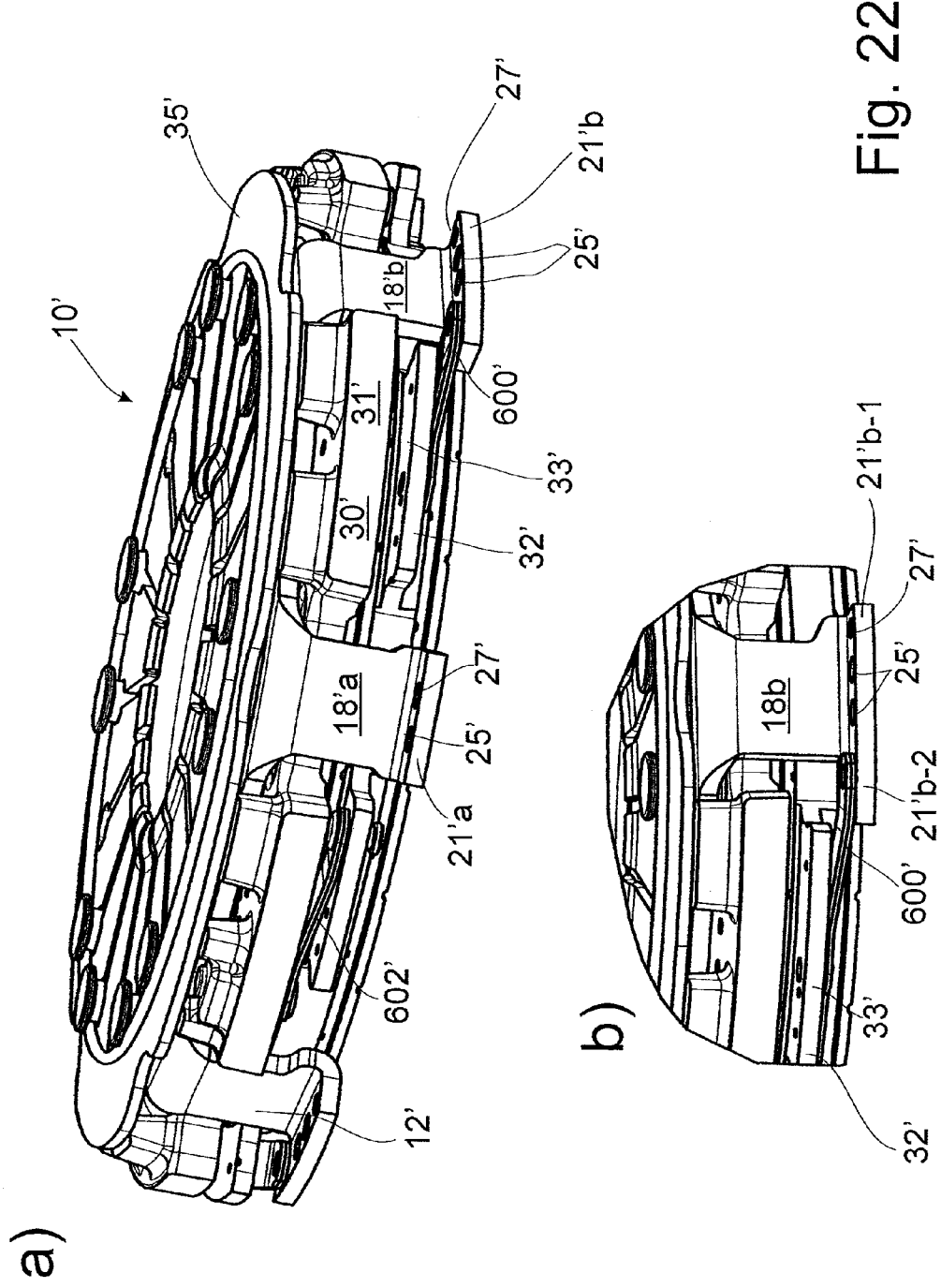
FIG. 22a shows a view of a circumferential area of yet another exemplary embodiment of a dual-disk clutch.
FIG. 22b shows an enlarged view of the circumferential area of the dual-disk clutch.

The exemplary embodiments of FIGS. 21 and 22 are characterized by the use of simple design measures to guarantee that, with respect to the flywheel (see FIG. 17), the stroke between the pressure plate and the intermediate plate and the stroke between the intermediate plate and the flywheel (or secondary flywheel) will always be the same as a result of the use of tangential leaf springs with the same geometry for both the springs between the housing and the intermediate plate and the springs between the intermediate plate and the pressure plate.

According to FIG. 21, the support sections 18'*b*, to the housing feet 21'*b* of which the tangential leaf spring 600' are attached, are shorter than the support sections 18'*a*, to the housing feet 21'*a* of which no tangential leaf spring are attached, by an amount equal to the thickness of the tangential leaf spring packages. The tangential leaf spring packages 600' have extended housing-side terminal sections, and these extended terminal areas are located between the housing feet 21'*b* and the flywheel (not shown), thus serving here, so to speak, as shims for the housing feet 21'*b* to compensate for the difference between the axial length of the support sections 18'*b* and that of the support sections 18'*a*. The feet 21'*b* can, for example, have four holes. The holes 25', which are located centrally in the circumferential direction, can be used to screw the feet to the flywheel with the help of corresponding holes in the terminal sections of the spring. Another hole 27' can be used for centering by means of a dowel pin, which passes through a corresponding opening in the spring section; and the remaining hole 77' can be used for the attachment of the tangential leaf spring package, especially for the riveting of the tangential leaf spring package to the housing foot 21'*b*. Holes or countersunk areas can be provided in the flywheel, into which parts of the fastening elements, possibly of rivets, used to attach the tangential leaf springs, can nest.

In the case of the exemplary embodiment of FIG. 22, by way of contrast, the support sections 18'*a*, to the housing feet 21'*a* of which no tangential leaf springs are attached, and the support sections 18'*b*, to the housing feet 21'*b* of which the tangential leaf spring 600' are attached, have the same axial length. Nevertheless, identical tangential leaf spring packages 600', 600" can be used for the tangential leaf spring 600' acting between the housing and the intermediate plate 32' and for the tangential leaf springs 600" acting between the intermediate plate and the pressure plate, in the same way as that shown in the exemplary embodiment according to FIG. 21. This goal is achieved by making the plate sections 33' of the intermediate plate 32' thinner than the axial thickness of the intermediate plate, where the fastening surface facing the flywheel, i.e., the surface against which the tangential leaf spring packages 600' rest, is offset axially from the flywheel-side friction surface of the intermediate plate toward the pressure plate by a distance equal to the axial thickness of the housing foot 21'*b*. The side of the tangential leaf springs 600' facing away from the flywheel and toward the intermediate plate 32' is connected, preferably permanently riveted, to the housing foot 21'*b*. The feet 21'*b* are designed in such a way that they support the tangential leaf spring packages 600' all the way to their housing-side inflection point, so that the support conditions at the attachment ends of the tangential leaf spring between the intermediate plate and the housing are the same as those at the attachment ends of the tangential leaf spring between the intermediate plate and the pressure plate.

The housing feet 21'*b* can have four holes, for example. The two holes 25' located centrally in the circumferential direction can be used to screw the feet to the flywheel. Another hole 27' can be used for centering on the flywheel by means of a dowel pin, and the remaining hole can be used to attach the tangential leaf spring package, especially to rivet the tangential leaf spring package, to the housing foot 21'*b*. Holes or countersunk areas can be provided in the flywheel, into which parts of the fastening elements, possibly of the rivets, used to attach the tangential leaf springs, can nest. With respect to the design of the housing feet 21'*b*, it should be pointed out that these are longer in the circumferential direction than the housing feet 21'*a*; that is, they have a section 21'*b*-2, which projects in the circumferential direction, to which the associated tangential leaf spring package 600' is attached. The foot section 21'*b*-1, located within the circumferential angle defined by the support section 18'*b*, carries the holes 25', 27' used for attachment and centering.

The exemplary embodiments according to FIGS. 21 and 22 offer the following advantages, among others. The intermediate plate is centered more effectively in the axial direction, because the tangential leaf springs all have the same free bending length and especially the same characteristic. Because each of the feet 21'*b* is screwed by two screws to the flywheel and because the screwed connections are symmetrical, the tension in the housing feet is minimized. Because two screws are used to make the connection, smaller screws can be used, which saves radial space and weight and makes it possible to transmit higher torques without increasing the radial dimension of the part.

It should be pointed out that the radially projecting plate sections 33' of the two embodiments of FIGS. 18-20 are already thinner in the axial direction than the intermediate plate 32' and that their fastening surfaces on the flywheel side are already shifted in the direction toward the pressure plate 30'. If this offset is equal to the axial thickness of the intermediate ring 29' or of the segments 29', then a situation similar to that of the exemplary embodiment according to FIG. 22 is obtained, and, because the tangential leaf springs between the housing and the intermediate plate can be identical to those between the intermediate plate and the pressure plate, it is possible for all the tangential leaf springs to have the same free bending lengths and the same force-distance characteristics. Like the exemplary embodiments of FIGS. 21 and 22, the exemplary embodiments of FIGS. 18 and 20 and the exemplary embodiment of FIG. 5 are to this extent also embodiments of the concept that the same effective spring stiffnesses and force-distance characteristics can be achieved by the use of identical tangential leaf springs and by means of a simple design for using tangential leaf springs both to retain and to guide the intermediate plate on the housing and to retain and to guide the pressure plate on the intermediate plate.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure plate assembly for a friction clutch including at least one disk, the pressure plate assembly comprising:

a housing fixed to an abutment arrangement for joint rotation therewith about an axis of rotation;

a plate arrangement comprising two plates mounted in the housing with freedom to rotate with the housing about the axis of rotation and operative to move axially relative to the housing;

an energy storage device supported on the housing and the plate arrangement and operative to generate an axial contact force exerted on the plate arrangement; and a releasing spring arrangement comprising at least one first leaf spring disposed between the plate arrangement and the housing operative to exert an elastic restoring force on the plate arrangement in opposition to the contact force and radially supporting the plate arrangement so as to prevent rotation of the plate arrangement and the housing relative to one another, and at least one second leaf spring between the two plates operative to exert an elastic restoring force to separate the two plates and radially supporting the two plates relative to each other to prevent relative rotation between the two plates, wherein the housing comprises a plurality of support sections extending axially between the abutment arrangement and the energy storage device radially outwards from the plate arrangement so as to radially cover the plate arrangement, the plurality of support sections being spaced circumferentially so as to define a plurality of circumferentially spaced apart openings each extending between adjacent support sections, and wherein each of the two plates comprises a plurality of circumferentially spaced apart plate sections radially extending into the openings between the support sections of the housing, the plate sections of one of the two plates of the plate arrangement supporting the energy storage device, the at least one first leaf spring and the at least one second leaf spring being arranged in different ones of the openings; and wherein each of the plurality of support sections each comprises a support surface flatly resting on the abutment arrangement either directly or indirectly and screwed or riveted to the abutment arrangement, the plurality of support sections of the housing each have an axially extending section terminating with a foot, the foot comprising an axially extending flange defining a support surface of the plurality of the support sections, and the foot extends radially outwards from the axially extending section of the plurality of support sections of the housing.

2. The pressure plate assembly of claim 1, wherein one of the two plates of the plate arrangement comprises a pressure plate supported by the releasing spring arrangement.

3. The pressure plate assembly of claim 2, wherein the other of the two plates of the plate arrangement comprises an intermediate plate spaced axially between the abutment arrangement and the pressure plate and operative to move axially relative to the housing in response to the contact force generated by the energy storage device.

4. The pressure plate assembly of claim 3, wherein the at least one first leaf spring acts between the intermediate plate and the housing and the at least one second leaf spring acts between the pressure plate and the intermediate plate.

5. The pressure plate assembly of claim 3, wherein the releasing spring arrangement is configured to support the pressure and intermediate plates during axial displacement of the plate arrangement so as to prevent tipping of at least one of the pressure and intermediate plates relative to the housing.

6. The pressure plate assembly of claim 1, wherein the releasing spring arrangement is configured so that torque is transmitted between the plate arrangement and the abutment arrangement, and between a clutch disk arrangement and the abutment arrangement, the clutch disk arrangement being clamped in the housing between the plate arrangement and the abutment arrangement.

7. The pressure plate assembly of claim 6, wherein the releasing spring arrangement is configured so that at least 50% of the torque to be transmitted by the friction clutch is transmitted between the housing and the plate arrangement.

8. The pressure plate assembly of claim 1, wherein the releasing spring arrangement is configured to dampen relative displacement between the plate arrangement and the housing.

9. The pressure plate assembly of claim 1, wherein each of the at least one first leaf spring and the at least one second leaf spring comprises a package including a plurality of tangential leaf springs axially layered upon one another, each package having one end connected to one of the plates of the plate arrangement and an opposite end connected to the housing or to another plate of the plate arrangement.

10. The pressure plate assembly of claim 9, wherein the tangential leaf springs in each of the packages are frictionally engaged to one another so as to dampen relative displacement between the housing and the plate arrangement.

11. The pressure plate assembly of claim 9, wherein each package having a uniform effective free bending length.

12. The pressure plate assembly of claim 11, wherein all of the packages are configured with uniform force-distance characteristics.

13. The pressure plate assembly of claim 1, wherein the plurality of support sections of the housing support the energy storage device.

14. The pressure plate assembly of claim 1, wherein each of the two plates has a central section carrying the plate sections, the central section having an axial thickness, the plate sections having an axial thickness which is less than the thickness of the central section.

15. The pressure plate assembly of claim 1, wherein at least one of the plate sections has an axially facing surface axially offset of an axially facing friction surface of the plate carrying the plate sections.

16. The pressure plate assembly of claim 15, wherein the axial offset is configured so as to provide the first and second sets of the releasing spring arrangement with a uniform bending length.

17. The pressure plate assembly of claim 1, wherein the housing has a housing wall forming the support sections, the housing wall being fixed to the abutment arrangement.

18. The pressure plate assembly of claim 1, wherein each of the at least one first leaf spring is riveted to one of the plurality of support sections of the housing.

19. The pressure plate assembly of claim 18, wherein the support sections of the housing each have a fastening surface facing axially away from the two plates, each the at least one first leaf spring being fixed to the fastening surface of a respective one of the support sections.

20. The pressure plate assembly of 18, wherein at least one of the support sections of the housing has a fastening surface facing towards the side of the housing and riveted to the at least one first leaf spring.

21. The pressure plate assembly of claim 1, wherein the energy storage device is mounted outside of the housing.

22. The pressure plate assembly of claim 21, wherein the housing comprises a housing cover located between the energy storage device and the plate arrangement and supporting the energy storage device, the housing cover and the support sections of the housing being coupled to one another.

23. The pressure plate assembly of claim 22, wherein the housing cover is a separately formed component fixed to the plurality of support sections of the housing.

24. The pressure plate assembly of claim 1, wherein the feet or the flanges of the support sections of the housing are fixed to the releasing spring arrangement.

25. The pressure plate assembly of claim 1, wherein the support surface of the flanges of the support sections is spaced axially from and juxtaposed with the abutment arrangement so as to selectively receive a one end of releasing springs of the releasing spring arrangement and to provide a uniform bending length of the springs of the spring releasing arrangement.

26. The pressure plate assembly of claim 25, wherein the plurality of support sections of the housing are arranged in first and second groups selectively coupled to the releasing spring arrangement so that the first group of the support sections, coupled to the releasing spring arrangement, is axially shorter than the second group of the support sections not coupled to the releasing spring arrangement.

27. The pressure plate assembly of claim 26, wherein the support sections of the first and second groups are configured to provide a uniform bending length of a plurality of springs of the spring releasing arrangement.

28. A pressure plate assembly for a friction clutch including at least one disk, the pressure plate assembly comprising:
a housing fixed to an abutment arrangement for joint rotation therewith about an axis of rotation;
a plate arrangement comprising two plates mounted in the housing with freedom to rotate with the housing about the axis of rotation and operative to move axially relative to the housing;
an energy storage device supported on the housing and the plate arrangement and operative to generate an axial contact force exerted on the plate arrangement; and
a releasing spring arrangement comprising a first leaf spring disposed between the plate arrangement and the housing operative to exert an elastic restoring force on the plate arrangement in opposition to the contact force and radially supporting the plate arrangement so as to prevent rotation of the plate arrangement and the housing relative to one another, and a second leaf spring disposed between the two plates operative to exert an elastic restoring force to separate the two plates and radially supporting the two plates relative to each other to prevent relative rotation between the two plates,
wherein the housing comprises a plurality of support sections extending axially between the abutment arrangement and the energy storage device radially outwards from the plate arrangement so as to radially cover the plate arrangement, the plurality of support sections being spaced circumferentially so as to define a plurality of circumferentially spaced apart openings each extending between adjacent support sections, and wherein each of the two plates comprises a plurality of circumferentially spaced apart plate sections radially extending into the openings between the support sections of the housing, the plate sections of one of the two plates engaging the energy storage device at a location occurring in a radial space between the support sections of the housing, the first leaf springs and the second leaf springs being disposed in different ones of the openings; and
wherein each of the plurality of support sections each comprises a support surface flatly resting on the abutment arrangement either directly or indirectly and screwed or riveted to the abutment arrangement, the plurality of support sections of the housing each have an axially extending section terminating with a foot, the foot comprising an axially extending flange defining a support surface of the plurality of the support sections, and the foot extends radially outwards from the axially extending section of the plurality of support sections of the housing.

29. The pressure plate assembly of claim 28, wherein the housing comprises a housing cover disposed between the energy storage device and the plate arrangement and supporting the energy storage device, the housing cover and the supporting sections being coupled.

30. The pressure plate assembly of claim 29, wherein the housing cover is a separately formed component fixed to the plurality of support sections of the housing.

31. The pressure plate assembly of claim 29, wherein one of the two plates is a pressure plate, the plate sections of the pressure plate extending between the support sections of the housing into the respective openings and each comprising an axially projecting support rib, the support ribs supporting the energy storage device.

32. The pressure plate assembly of claim 31, wherein the energy storage device is a diaphragm spring arrangement comprising at least one diaphragm spring configured with a ring-shaped section and a spring tab, the spring tab extending radially outwards from the ring-shaped section and being axially supported by the plurality of plate sections of the support plate.

33. The pressure plate assembly of claim 32, wherein the support ribs are arranged so that they slant relative to a tangent of the circumference of the one of the two plates.

* * * * *